: US006850393B2

United States Patent
Hara et al.

(10) Patent No.: US 6,850,393 B2
(45) Date of Patent: Feb. 1, 2005

(54) MAGNETIC HEAD INCLUDING A MAGNETO RESISTIVE FILM CONNECTED TO A YOKE PORTION

(75) Inventors: Michiko Hara, Yokohama (JP); Tomomi Funayama, Fujisawa (JP); Masatoshi Yoshikawa, Yokohama (JP); Kohichi Tateyama, Yokohama (JP); Hiroaki Yoda, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 189 days.

(21) Appl. No.: 09/956,127

(22) Filed: Sep. 20, 2001

(65) Prior Publication Data

US 2002/0036873 A1 Mar. 28, 2002

(30) Foreign Application Priority Data

Sep. 26, 2000  (JP) ........................................ 2000-291926
Sep. 29, 2000  (JP) ........................................ 2000-300637

(51) Int. Cl.[7] .................................................. G11B 5/39
(52) U.S. Cl. .................... 360/321; 360/322; 360/324.1; 360/324.2
(58) Field of Search ................................ 360/321, 317, 360/324.1, 324.11, 324.12, 324.2, 126, 322

(56) References Cited

U.S. PATENT DOCUMENTS

| 5,648,884 | A | | 7/1997 | Lazzari ........................ 360/321 |
| 5,909,344 | A | * | 6/1999 | Gill ............................. 360/321 |
| 5,910,869 | A | * | 6/1999 | Fedeli ......................... 360/318.1 |
| 6,219,212 | B1 | | 4/2001 | Gill et al. ................. 360/324.2 |
| 6,285,531 | B1 | * | 9/2001 | Ohsawa et al. ............. 360/317 |
| 6,519,124 | B1 | * | 2/2003 | Redon et al. ............. 360/324.2 |
| 6,577,476 | B1 | * | 6/2003 | Childress et al. ...... 360/324.11 |

FOREIGN PATENT DOCUMENTS

| JP | 9-22509 | 1/2003 |
| KR | 2000-0022772 | 4/2000 |

OTHER PUBLICATIONS

U.S. Appl. No. 09/956,127, filed Sep. 20, 2001, Pending.
U.S. Appl. No. 09/961,171, filed Sep. 24, 2001, Pending.
U.S. Appl. No. 09/810,187, filed Mar. 19, 2001, Pending.
U.S. Appl. No. 09/938,611, filed Aug. 27, 2001, Pending.
U.S. Appl. No. 09/942,627, filed Aug. 31, 2001, Pending.

* cited by examiner

*Primary Examiner*—Jefferson Evans
(74) *Attorney, Agent, or Firm*—Oblon, Spivak, McClelland, Maier & Neustadt, P.C.

(57) ABSTRACT

In a yoke type reproducing magnetic head, a magnetoresistance effect film can be arranged in the vicinity of a medium facing surface, so that sensitivity is improved. The yoke type reproducing magnetic head comprises: a pair of magnetic yokes which face each other via a magnetic gap, at least one of the pair of magnetic yokes extending from a medium facing surface to a position retracted from the medium facing surface; a magnetoresistance effect film which has a curved portion protruding toward the medium facing surface in the magnetic gap and which is magnetically connected to the magnetic yokes; and an electrode which is electrically connected to the magnetoresistance effect film.

9 Claims, 18 Drawing Sheets

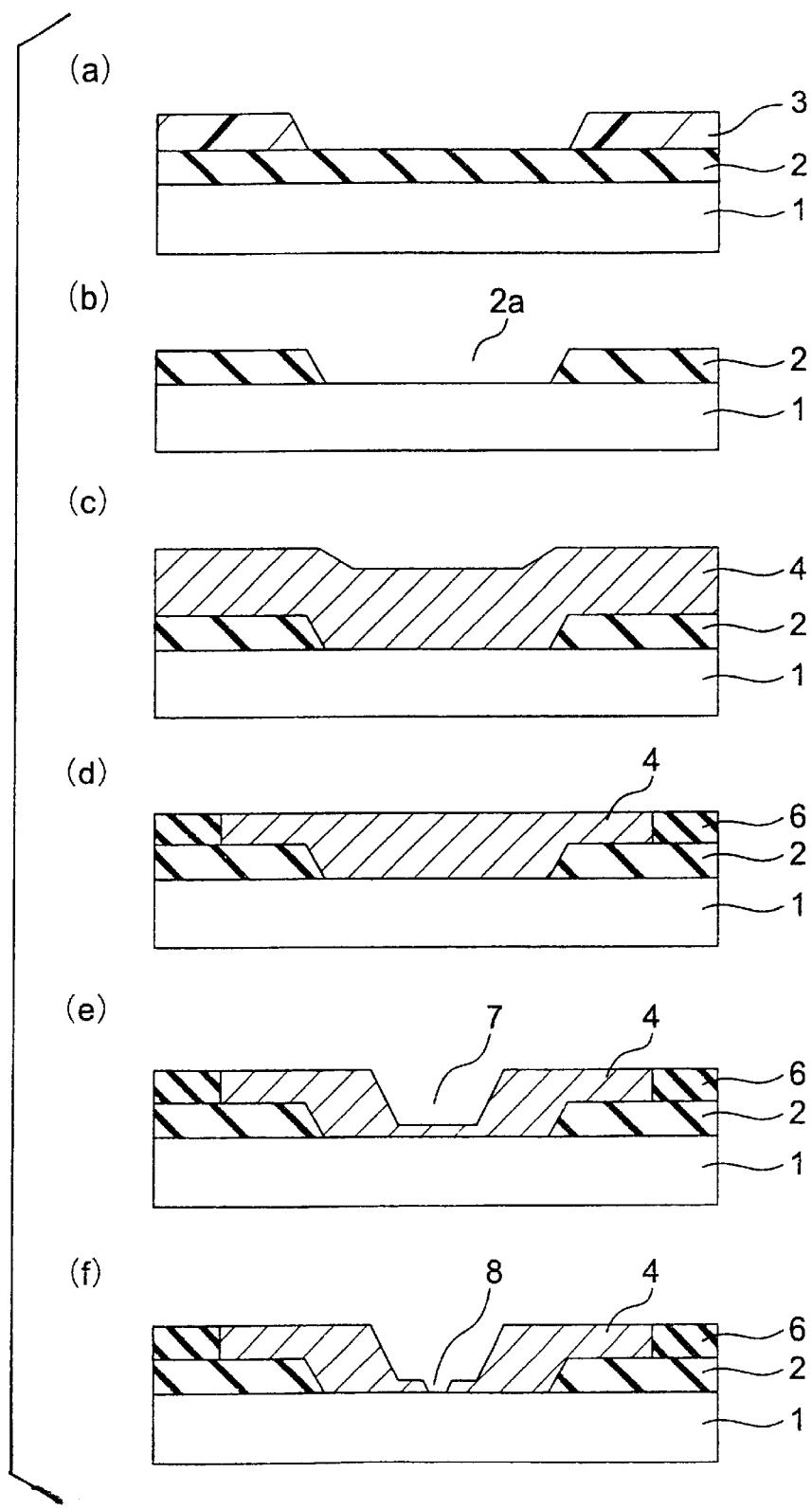
F I G. 4

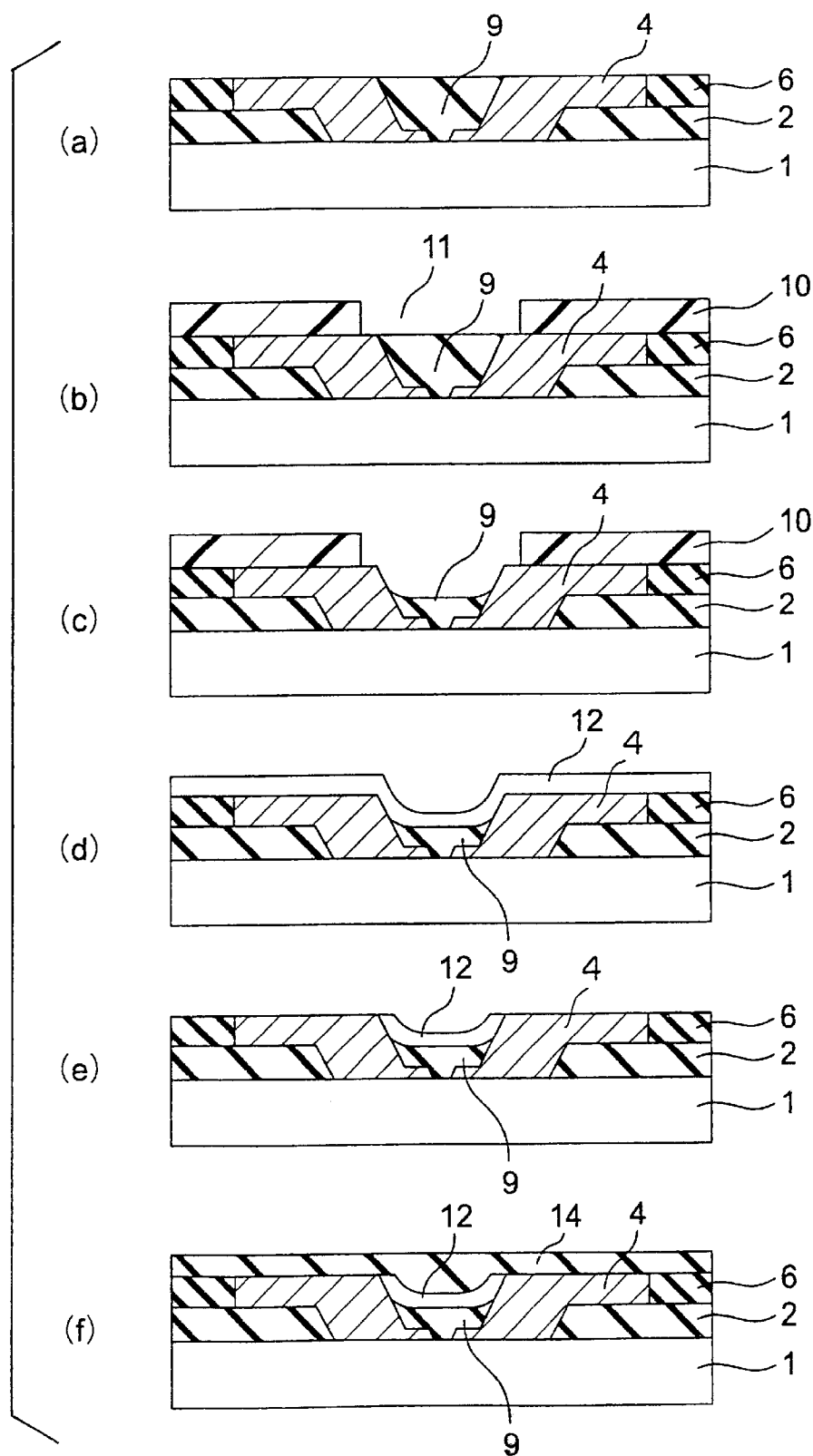
F I G. 5

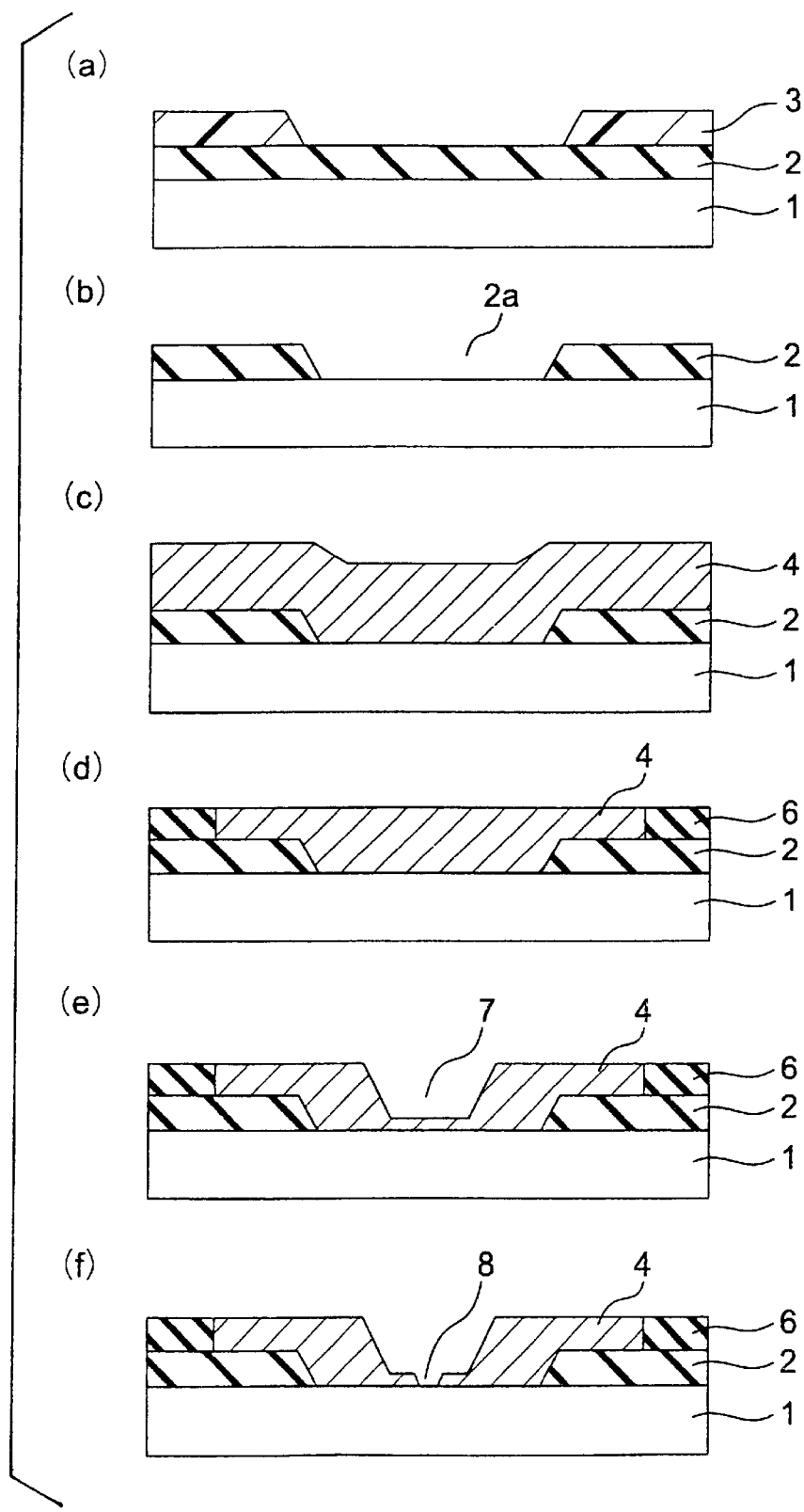
F I G. 11

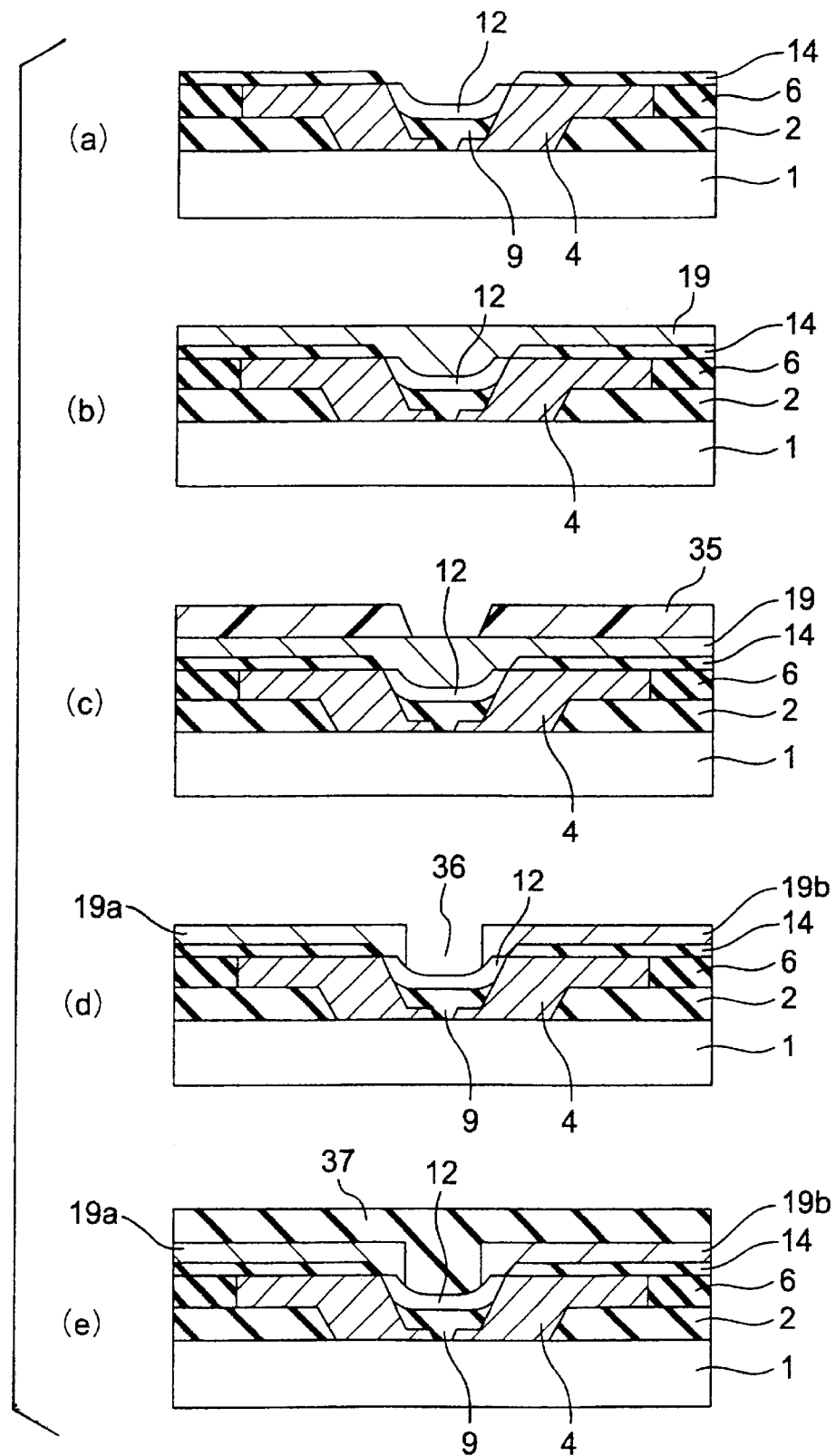
F I G. 13

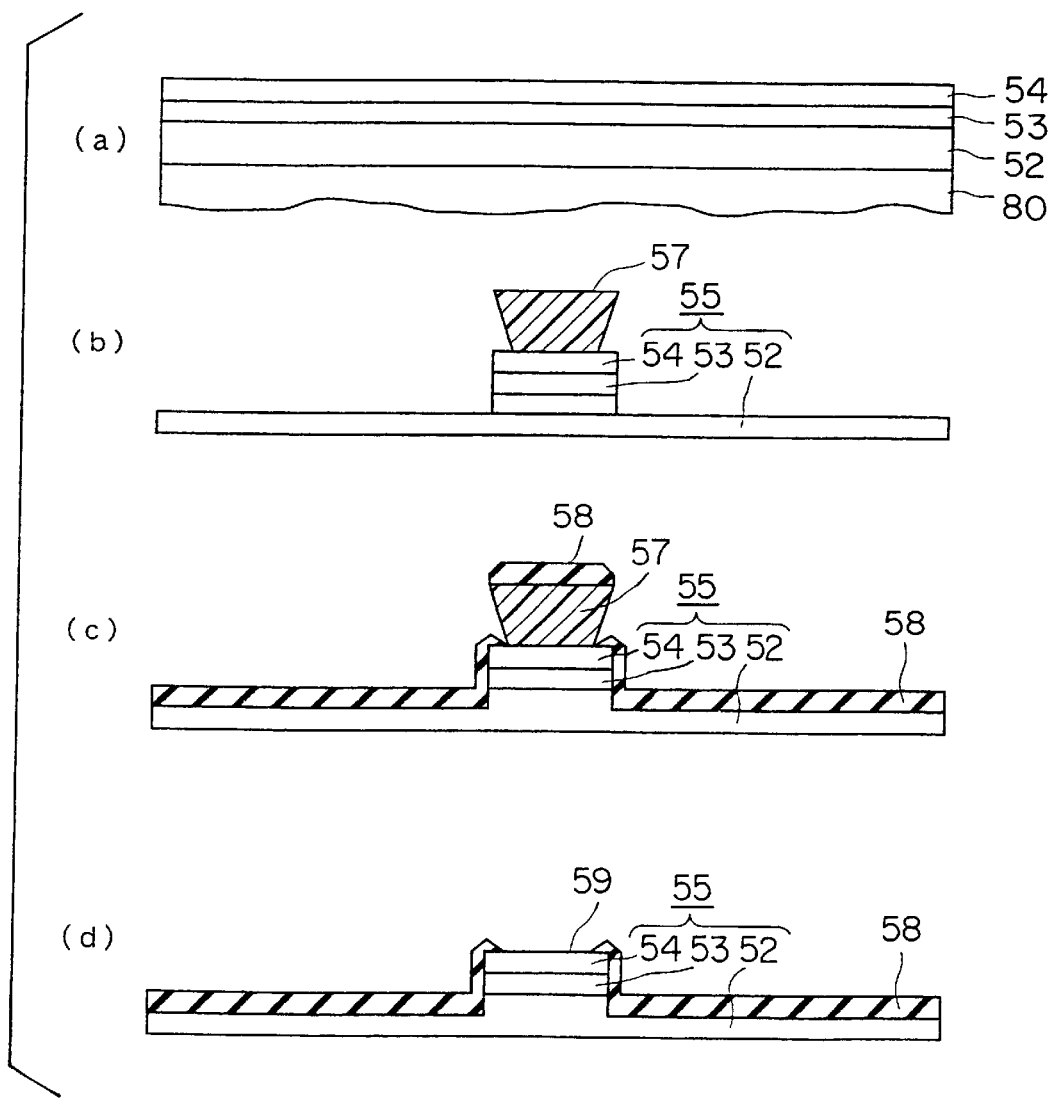
F I G. 15

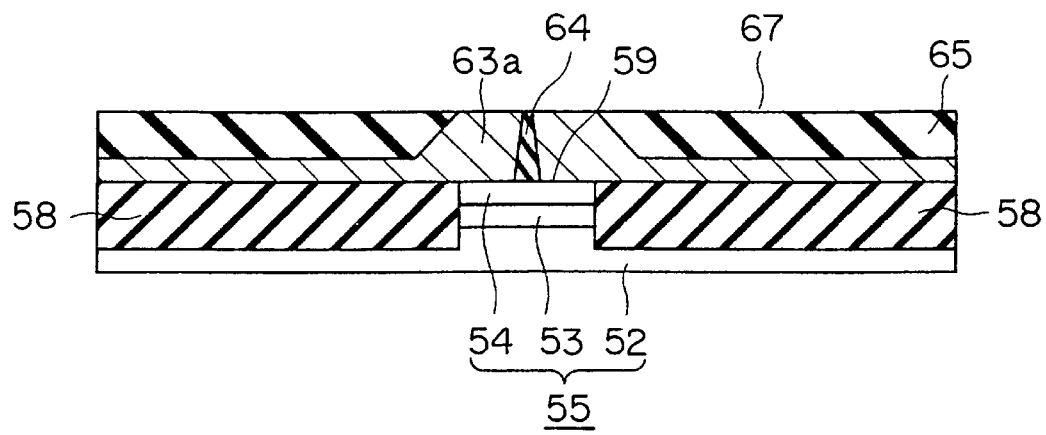
F I G. 17
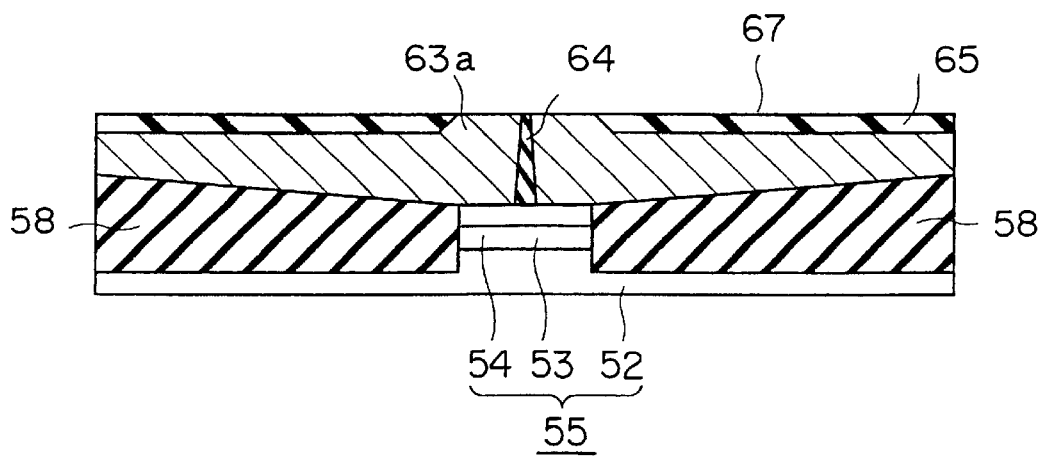
F I G. 18

MAGNETIC HEAD INCLUDING A MAGNETO RESISTIVE FILM CONNECTED TO A YOKE PORTION

CROSS REFERENCE TO RELATED APPLICATION

This application is based upon and claims benefit of priority from the prior Japanese Patent Applications No. 2000-291926, filed on Sep. 26, 2000; and No. 2000-300637, filed on Sep. 29, 2000; the entire contents of which are incorporated herein by reference.

BACKGROUND OF THE INVENTION

1. Field of The Invention

The present invention relates generally to a yoke type reproducing magnetic head detecting signals to be recorded and stored in a magnetic recording medium.

2. Description of Related Art

In recent years, magnetic recording systems, such as hard disk drives, are rapidly miniaturized and densified, and expected to be further densified in future. In order to enhance the density in magnetic recording, it is required to narrow the recording track width to enhance the recording track density, and it is required to enhance the recording density in longitudinal directions of a recording track, i.e., the linear recording density, However, in an inplane longitudinal recording system, there are problems in that, as the recording density increases, the demagnetizing field increases, the reproducing output decreases, and stable recording operations can not be carried out. As a system for eliminating these problems, the vertical recording system has been proposed. This vertical recording system is designed to carry out magnetization in directions perpendicular to the surface of a recording medium to carrying out recording. Even if the recording density is increased with respect to recording in longitudinal directions, the influence of the diamagnetic field is small and the lowering of the regenerative output is suppressed.

By the way, in either of the longitudinal recording or the vertical recording, an inductive head is conventionally used for reproducing medium signals. However, the AMR head which uses the anisotropic magnetoresistance effect and which has a high regenerative sensitivity is developed to be used as a shielded reproducing head so that a sufficient regenerative signal output can be obtained even if the recording track width becomes narrower and the magnitude of recorded magnetization decreases with the increase of density. In recent years, the spin-valve-type GMR head which utilizes the giant magnetoresistance effect (GMR) and which has a higher regenerative sensitivity is used, and the magnetic head is developed and studied for practical use.

In addition, in order to obtain a greater rate of change in resistance, it is proposed to use a magnetoresistance effect film (MR film) which is used in a system (vertical current applying (current perpendicular to plane) system) in which a sense current is caused to flow in a thickness direction (a direction perpendicular to the plane of the film), unlike the conventional system in which a sense current is caused to flow in a direction parallel to the principal plane of the film.

As a typical film which is used by causing a sense current to flow in thickness directions, there is a spin-tunneling type magnetoresistance effect (which will be also hereinafter referred to as TMR) film.

A conventional magnetic head using a vertical current applying MR film is disclosed in, e.g., Japanese Patent Laid-Open No. 11-316919. As shown in FIG. 21, in this conventional magnetic head, a vertical current applying MR film 75 comprises a free layer 71, an insulating layer 72, a pinned layer 73 and an antiferromagnetic film 74, and the contact area of an electrode 90 for supplying a sense current 78 to the vertical current applying MR film 75 is smaller than the film area of the vertical current applying MR film 75. Therefore, the magnetic field due to current, which is generated from the portion of the narrow electrode (pillar electrode) 90 joined to the vertical current applying MR film 75, influences the vertical current applying MR film 75. Furthermore, in FIG. 19, reference number 80 denotes an electrode film, reference number 82 denotes a magnetic domain, reference number 83 denotes an insulating film, reference number 85 denotes a through hole, reference number 92 denotes a top shielding film, and reference number 94 denotes a bottom shielding film.

In addition, an example of a vertical current applying MR film applied to a shielded magnetic head is disclosed in Japanese Patent Laid-Open No. 11-316919. Since a typical shielded head is used in a state that an MR film is exposed to a medium facing surface (which will be also hereinafter referred to as an ABS: Air Bearing Surface) to approach a recording medium, the shielded head can cause many magnetic fluxes to flow from the recording medium into the MR film, so that it has the merit of being capable of obtaining excellent regenerative sensitivity. On the other hand, the shielded head has the demerit of being easy to cause abrasion and deterioration of the MR film in the polishing of the ABS surface in the fabricating process, and the demerit of having the poor durability of the MR film while the medium is traveling.

Thus, magnetic heads having a high regenerative sensitivity have been developed. By using these magnetic heads, a recording signal begins to be able to be reproduced even if it has a very small recording bit size.

Since the scale down of the recording bit proceeds as the density is further enhanced in future, it is required to sensitively detect a small number of magnetic fluxes generated from a recording medium.

On the other hand, in order to enhance the linear recording density which is the density in longitudinal directions of a recording track, it is required to narrow the gap of a magnetic head. However, in the above described conventional magnetic heads using the magnetoresistance effect, a magnetoresistance effect element is put in a shield gap. Therefore, even in the case of the AMR head or the spin-valve GMR head, the thickness of the magnetoresistance effect element must be about 30 nm, and 70 nm between shields in view of insulation from the shields. For that reason, in the conventional type of magnetic heads, the thickness of the magnetoresistance effect element capable of narrowing the head gap is limited to about 70 nm. Therefore, there is a severe limit to the enhancement of the track recording density.

In addition, in magnetic recording systems such as hard disk drives, the flying height which is the distance between a magnetic head and a recording medium decreases with the enhancement of the recording density. The decrease of the flying height means that the probability of head's collision is increased by the slight protrusion of the recording medium. In fact, there is a problem in TA (Thermal Asperity) noise. Therefore, a yoke type head for drawing a magnetic flux into a magnetoresistance effect film via a yoke is preferably used so that the magnetoresistance effect film is not exposed directly to the medium facing surface. In the case of such a yoke type magnetic head, a structure that a magnetoresistance effect film is provided on a surface parallel to the medium facing surface is advantageous since the whole magnetoresistance effect film can be arranged in the vicinity of the medium. As such a structure, a horizontal yoke type magnetic head wherein a yoke and a magnetoresistance effect element are arranged in parallel to the plane of a substrate is proposed.

However, in the case of the horizontal yoke type magnetic head, it is required to increasingly decrease the size of the head with the enhancement of the recording density, and the magnetoresistance effect element must approach the medium facing surface. Although the photolithography technique progresses, an alignment precision of about tens nm is required to make a head having a sub-micron size. It is very difficult to prepare a head with such a precision.

SUMMARY OF THE INVENTION

It is therefore an object of the present invention to eliminate the aforementioned problems and to provide a yoke type reproducing magnetic head capable of arranging a magnetoresistance effect film in the vicinity of a medium facing surface and of improving a regenerative sensitivity, a method for fabricating the same, and a magnetic disk system using the same.

In order to accomplish the aforementioned and other objects, a yoke type reproducing magnetic head according to an aspect of the present invention comprises: a pair of magnetic yokes facing each other via a magnetic gap, at least one of the pair of magnetic yokes extending from a medium facing surface to a position backed from the medium facing surface; a magnetoresistance effect film having a curved portion protruding toward the medium facing surface in the magnetic gap and being magnetically connected to the magnetic yokes; and an electrode electrically connected to the magnetoresistance effect film.

According to the yoke type reproducing magnetic head of the aspect of the present invention with such a construction, the magnetoresistance effect film is formed so as to have the curved portion protruding toward the medium facing surface in the magnetic gap. Thus, the magnetoresistance effect element can be arranged in the vicinity of the medium facing surface and directly above the tip of the magnetic gap, so that the magnetic path can be very short. Therefore, it is possible to enhance the regenerative efficiency and it is possible to improve the regenerative sensitivity.

A yoke type reproducing magnetic head according to another aspect of the present invention comprises: a magnetic yoke having a magnetic gap; and a magnetoresistance effect film comprising a magnetization free layer in which the direction of magnetization moves in response to the direction of a signal magnetic field, a non-magnetic layer stacked on the magnetization free layer, and a magnetization fixed layer which is staked on the non-magnetic layer and in which the direction of magnetization does not substantially vary even in the signal magnetic field, the size of the film surface of a part of the magnetization fixed layer being formed so as to be smaller than the size of the film surface of the magnetization free layer, a part of the magnetic yoke including the magnetic gap on the opposite surface of same magnetic yoke to a medium facing surface being electrically connected to the top face of the magnetization fixed layer of the magnetoresistance effect film.

A yoke type reproducing magnetic head fabricating method according to an aspect of the present invention comprises: forming a pair of magnetic yokes facing each other via a magnetic gap; filling the magnetic gap with a non-magnetic film having a different etching rate from that of the magnetic yokes; forming a portion having a difference in level, in the magnetic gap portion by utilizing a difference in etching rate; and filling the portion having the difference in level, with a magnetoresistance effect film.

A yoke type reproducing magnetic head fabricating method according to another aspect of the present invention comprises: forming a magnetic yoke; forming a portion having a difference in level, between the opposite surface of the magnetic yoke to a medium facing surface and the opposite surface of the magnetic gap to the medium facing surface; and filling the portion having the difference in level, with a magnetoresistance effect film.

A yoke type reproducing magnetic head fabricating method according to another aspect of the present invention comprises: forming an electrode having a protruding portion; forming a side wall of an insulating film on the side of the protruding portion; forming a magnetoresistance effect film so as to cover the protruding portion and the side wall; and forming a magnetic yoke having a magnetic gap on the protruding portion.

A yoke type reproducing magnetic head fabricating method according to an aspect of the present invention comprises: forming a magnetoresistance effect film which comprises a magnetization free layer in which the direction of magnetization moves in response to the direction of a signal magnetic field, a non-magnetic layer stacked on the magnetization free layer, and a magnetization fixed layer which is staked on the non-magnetic layer and in which the direction of magnetization does not substantially vary even in the signal magnetic field, the size of the film surface of a part of the magnetization fixed layer being smaller than the size of the film surface of the magnetization free layer; forming an insulating film having a contact hole, the bottom face of which is substantially the whole top face of the magnetization fixed layer, on the magnetoresistance effect film; and forming a magnetic yoke having a magnetic gap in the contact hole and being electrically connected to the top face of the magnetization fixed layer.

A magnetic disk unit according to an aspect of the present invention uses the above described yoke type reproducing magnetic head as a reproducing magnetic head.

BRIEF DESCRIPTION OF THE DRAWINGS

The present invention will be understood more fully from the detailed description given herebelow and from the accompanying drawings of the embodiments of the invention. However, the drawings are not intended to imply limitation of the invention to a specific embodiment, but are for explanation and understanding only.

In the drawings:

FIGS. 4(a) through 4(f) are sectional views showing steps of fabricating the fourth embodiment of the present invention;

FIGS. 5(a) through 5(f) are sectional views showing steps of fabricating the fourth embodiment of the present invention;

FIGS. 11(a) through 11(f) are sectional views showing steps of fabricating the sixth embodiment of the present invention;

FIGS. 13(a) through 13(e) are sectional views showing steps of fabricating the sixth embodiment of the present invention;

FIGS. 15(a) through 15(d) are sectional views showing steps of fabricating the eighth embodiment of the present invention;

FIG. 17 is a sectional view showing the construction of the ninth embodiment of the present invention;

FIG. 18 is a sectional view showing the construction of the tenth embodiment of the present invention;

DESCRIPTION OF THE EMBODIMENTS

Referring now to the accompanying drawings, the embodiments of the present invention will be described below.

(First Embodiment)

Figure 1A:
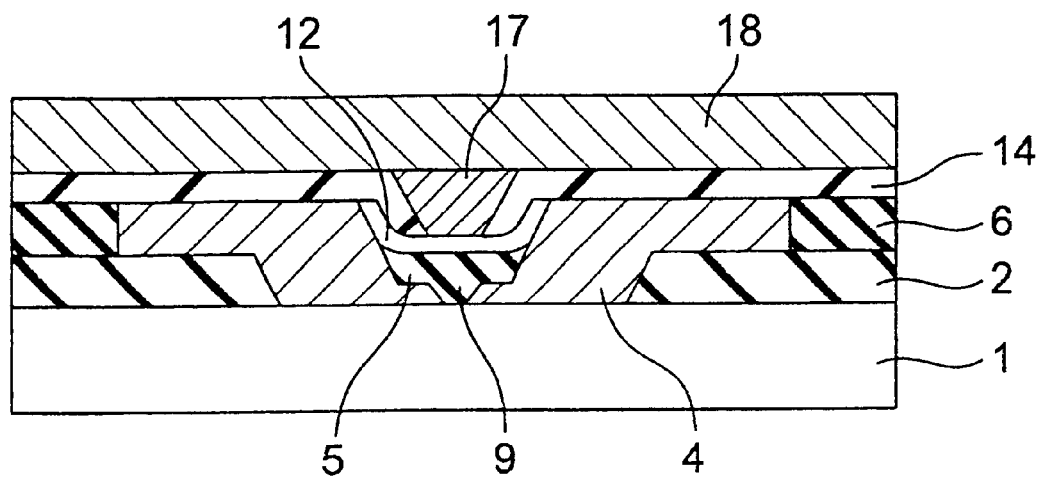
FIG. 1A is a sectional view showing the construction of the first embodiment of the present invention.

A construction of a horizontal reproducing magnetic head according to the first embodiment of the present invention is shown in FIG. 1A. FIG. 1A is a sectional view of a horizontal reproducing magnetic head in this embodiment in track longitudinal directions.

The horizontal reproducing magnetic head in this embodiment comprises: a pair of magnetic yokes 4 which are formed on a substrate 1 so as to face each other via a magnetic gap 5; a magnetoresistance effect film (which will be also hereinafter referred to as an MR film) 12 which is curved in the magnetic gap 5 so that its end portions extend along the inner walls of the magnetic yokes 4 and its central portion faces a medium facing surface; a leading electrode 17 which is provided on the surface of the magnetoresistance effect film 12; and an electrode 18 for applying a current to the magnetoresistance effect film 12 via the leading electrode 17. Furthermore, the magnetoresistance effect film 12 is formed so as to be convex toward the medium facing surface since it is curved in the magnetic gap 5 so that its end portions extend along the inner walls of the magnetic yokes 4 and its central portion faces the medium facing surface. In this embodiment, an insulating film 9 is provided in the magnetic gap 5. By this insulating film 9, a portion having a difference in level is formed so as to be curved in the magnetic gap 5. Along this portion having the difference in level, the magnetoresistance effect film 12 is formed.

The electrode 18 is connected to the leading electrode 17. The electrode 18 is electrically insulated from the magnetic yokes 4 by an insulating film 14. An insulating film 2 is provided between the medium facing surface of the magnetic yokes 4 and portions of the magnetic yokes 4 which do not contact the medium facing surface, and an insulating film 6 is provided around the magnetic yokes 4. Furthermore, the substrate 1 is peeled off from the magnetic yokes 4 after the magnetic head is formed.

If the magnetoresistance effect film 12 is thus formed so as to be convex toward the medium facing surface, the magnetoresistance effect element can be more close to the medium facing surface and can be arranged directly above the tip of the magnetic gap, so that the magnetic path can be very short to enhance the regenerative efficiency to improve the regenerative sensitivity. Since the end portions of the magnetoresistance effect film 12 are formed so as to extend along the inner walls of the magnetic yokes 4, the contact area of the magnetic yokes 4 to the magnetoresistance effect film 12 can be increased to decrease the magnetic resistance, so that it is possible to enhance the efficiency. In addition, it is possible to prevent the portion of the magnetic gap 5 from being shifted from the magnetoresistance effect film 12, and it is not required to carry out a precise alignment, so that it is possible to decrease the size of the magnetic gap 5 on the side of the medium facing surface.

Furthermore, in this embodiment, the magnetoresistance effect element of the vertical current applying (current perpendicular to plane) system is used, and the magnetic yokes 4 also serve as electrodes.

The magnetoresistance effect film in this embodiment may be an anisotropic magnetoresistance effect film, or a giant magnetoresistance effect element, such as a spin-valve, and it is preferably a vertical current applying (current perpendicular to plane) type magnetoresistance effect film, such as a tunneling magnetoresistance effect film, which has a higher sensitivity.

Figure 1B:
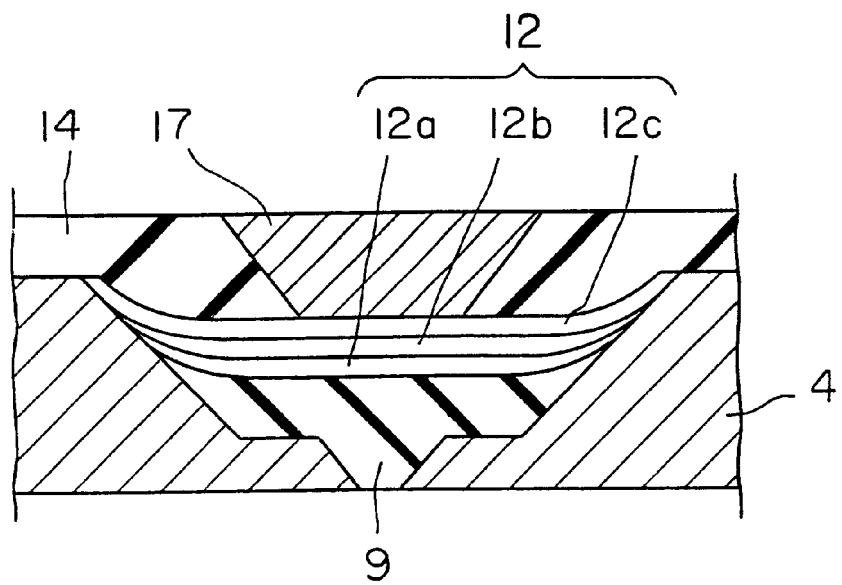
FIG. 1B is a sectional view showing the construction of a modified example of the first embodiment.

If a spin-valve is used as the magnetoresistance effect element, the free layer is preferably formed on the near side to the medium facing surface. For example, as shown in FIG. 1B, the magnetoresistance effect film 12 is preferably formed by forming a magnetization free layer (which will be also hereinafter referred to as a free layer) 12a, a spacer layer 12b of a non-magnetic material, and a magnetization fixed layer (which will be also hereinafter referred to as a pinned layer) 12c in that order. Furthermore, among the components of the magnetoresistance effect film 12, an underlying layer of Ta or the like which underlies the free layer 12a, an antiferromagnetic layer of PtMn or the like, and a protective layer of Ta or the like which is an upper layer above the pinned layer 12c, are not shown. With such a construction, the free layer 12a which is an actual magneto-sensitive portion approaches the medium facing surface, and the magnetic yokes 4 approach the free layer 12a, so that the magnetic patch can be short to enhance the regenerative efficiency to improve the regenerative sensitivity.

Furthermore, since the insulating film 9 is a non-magnetic material, a portion having a difference in level may be formed so as to be curved in the magnetic gap by forming another non-magnetic material so as to be thinner than the magnetic yokes 4.

(Second Embodiment)

Figure 2A:
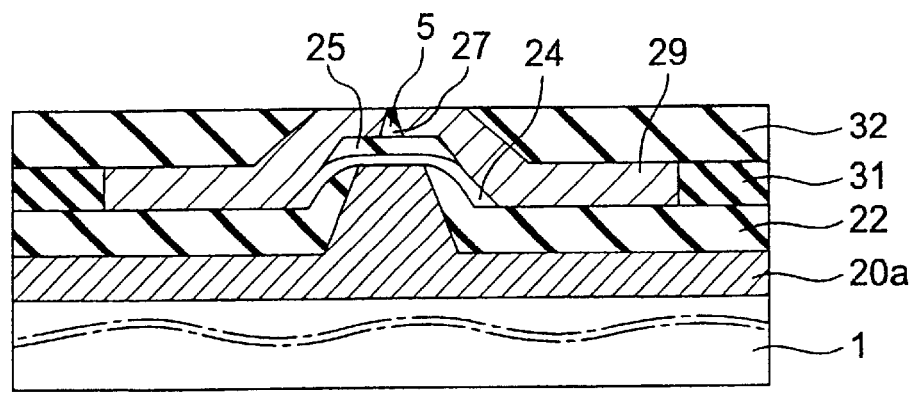
FIG. 2A is a sectional view showing the construction of the second embodiment of the present invention.

A construction of a horizontal reproducing magnetic head according to the second embodiment of the present invention is shown in FIG. 2A. FIG. 2A is a sectional view of a horizontal reproducing magnetic head in this embodiment in track longitudinal directions. The horizontal reproducing magnetic head in this embodiment is prepared by stacking layers so that the horizontal reproducing magnetic head in the first embodiment shown in FIG. 1A is turned upside down, The horizontal reproducing magnetic head in this embodiment comprises: an electrode 20a which is formed on a substrate 1 so as to have a protruding portion; a pair of magnetic yokes 29 which are formed so as to face each other via a magnetic gap 5; a magnetoresistance effect film 24 which is electrically connected to the protruding portion of the electrode 20a and which is curved in the magnetic gap 5 so that its end portions extend along the inner walls of the magnetic yokes 29 and its central portion faces a medium facing surface. Furthermore, the magnetoresistance effect film 24 is formed so as to be convex toward the medium facing surface since it is curved in the magnetic gap 5 so that its end portions extend along the inner walls of the magnetic yokes 29 and its central portion faces the medium facing surface. In this embodiment, insulating films 25 and 27 are provided in the magnetic gap 5. By the insulating film 25, a portion having a difference in level is formed so as to be curved in the magnetic gap 5. Along this portion having the difference in level, the magnetoresistance effect film 24 is formed. The electrode 20a is electrically insulated from the magnetic yokes 29 by an insulating film 22. In addition, an insulating film 32 is provided between the medium facing surface of the magnetic yokes 29 and portions of the magnetic yokes 29 which do not contact the medium facing surface, and an insulating film 31 is provided around the magnetic yokes 29.

In this embodiment, the magnetoresistance effect film 24 is curved so as to extend along the electrode 20 having the protruding portion and the insulating film 25. By thus forming the magnetoresistance effect film 24, the magnetoresistance effect element is more close to the medium facing surface. Therefore, it is possible to enhance the efficiency, and it is possible to prevent the portion of the magnetic gap 5 from being shifted from the magnetoresistance effect film 24. Thus, it is possible to decrease the size of the magnetic gap 5 on the side of the medium facing surface, and it is possible to arrange the magnetoresistance effect film 24 in the vicinity of the medium facing surface. Therefore, it is possible to improve the regenerative efficiency.

Furthermore, in this embodiment, the magnetoresistance effect element of the vertical current applying (current perpendicular to plane) system is used, and the magnetic yokes 4 also serve as electrodes.

The magnetoresistance effect film in this embodiment may be an anisotropic magnetoresistance effect film, or a giant magnetoresistance effect element, such as a spin-valve, and it is preferably a vertical current applying (current perpendicular to plane) type magnetoresistance effect film, such as a tunneling magnetoresistance effect film, which has a higher sensitivity.

Figure 2B:
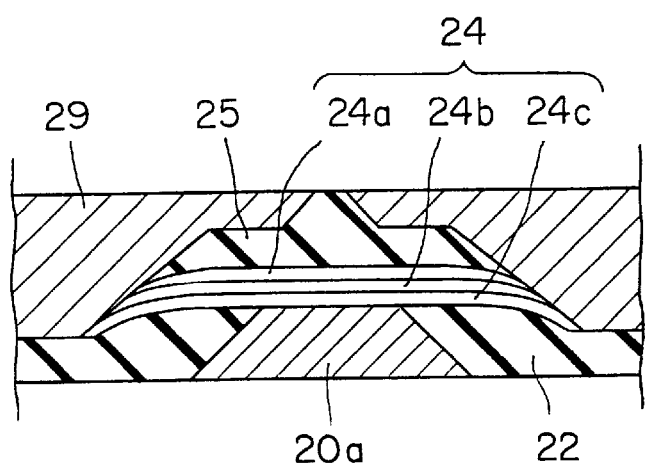
FIG. 2B is a sectional view showing the construction of the second embodiment.

If a spin-valve is used as the magnetoresistance effect element, the free layer is preferably formed on the near side to the medium facing surface. For example, as shown in FIG. 2B, the magnetoresistance effect film 24 is preferably formed by forming a pinned layer 24c, a spacer layer 24b and a free layer 24a in that order. Furthermore, an underlying layer of Ta or the like which underlies the pinned layer 24c, an antiferromagnetic layer of PtMn or the like, and a protective layer of Ta or the like which is an upper layer above the free layer 24a, are not shown. With such a construction, the free layer 24a which is an actual magneto-sensitive portion approaches the medium facing surface, and the magnetic yokes 29 approach the free layer 24a, so that the magnetic patch can be short to enhance the regenerative efficiency to improve the regenerative sensitivity.

Furthermore, since the insulating films 25 and 27 are non-magnetic materials, a portion having a difference in level may be formed so as to be curved in the magnetic gap by forming another non-magnetic material so as to be thinner than the magnetic yokes 29.

(Third Embodiment)

Figure 3:
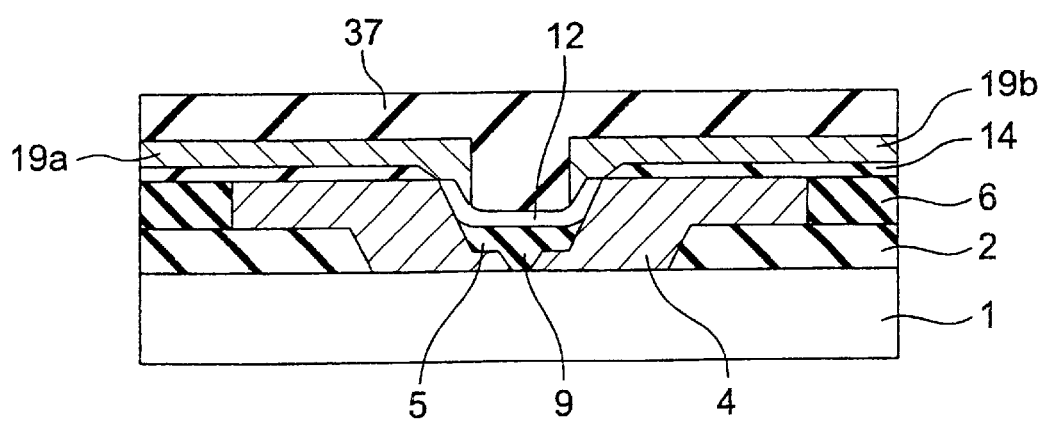
FIG. 3 is a sectional view showing the construction of the third embodiment of the present invention.

A construction of a horizontal reproducing magnetic head according to the third embodiment of the present invention is shown in FIG. 3. FIG. 3 is a sectional view of a horizontal reproducing magnetic head in this embodiment in track longitudinal directions.

The horizontal reproducing magnetic head in this embodiment comprises: a pair of magnetic yokes 4 which are formed on a substrate 1 so as to face each other via a magnetic gap 5; a magnetoresistance effect film 12 which is curved in the magnetic gap 5 so that its end portions extend along the inner walls of the magnetic yokes 4 and its central portion faces a medium facing surface; and electrodes 19a and 19b, provided on both end portions of the magnetoresistance effect film 12 in track longitudinal directions, for applying a current to the magnetoresistance effect film 12. Furthermore, in this embodiment, an insulating film 9 is provided in the magnetic gap 5. By this insulating film 9, a portion having a difference in level is formed in the magnetic gap 5. Along this portion having the difference in level, the magnetoresistance effect film 12 is formed.

The electrodes 19a and 19b are electrically insulated from the magnetic yokes 4 by an insulating film 14. An insulating film 2 is provided between the medium facing surface of the magnetic yokes 4 and portions of the magnetic yokes 4 which do not contact the medium facing surface, and an insulating film 6 is provided around the magnetic yokes 4. Furthermore, the substrate 1 is peeled off from the magnetic yokes 4 after the magnetic head is formed. In addition, the electrodes 19a and 19b are covered with an insulating film 37.

With such a construction, the magnetoresistance effect element 12 can be more close to the medium facing surface, so that it is possible to enhance the efficiency and it is possible to prevent the portion of the magnetic gas 5 from being shifted from the magnetoresistance effect film 12. Thus, it is possible to decrease the size of the magnetic gap 5 on the side of the medium facing surface, and it is possible to arrange the magnetoresistance effect element in the vicinity of the medium facing surface. Therefore, it is possible to improve the regenerative sensitivity.

Furthermore, in this embodiment, the magnetoresistance effect element of the vertical current applying (current perpendicular to plane) system is used, and the electrodes 19a and 19b are formed so as to be stacked on the magnetoresistance effect film 12 on the inner walls of the magnetic yokes 4 similar to the magnetoresistance effect film 12. By forming such electrodes 19a and 19b, it is possible to prevent the portion of the magnetic gap 5 from being shifted from the electrodes 19a and 19b, and it is possible to practically use the effective portion of the magnetoresistance effect element 12.

The magnetoresistance effect film in this embodiment may be an anisotropic magnetoresistance effect film, or a giant magnetoresistance effect element, such as a spin-valve.

(Fourth Embodiment)

Figure 6:
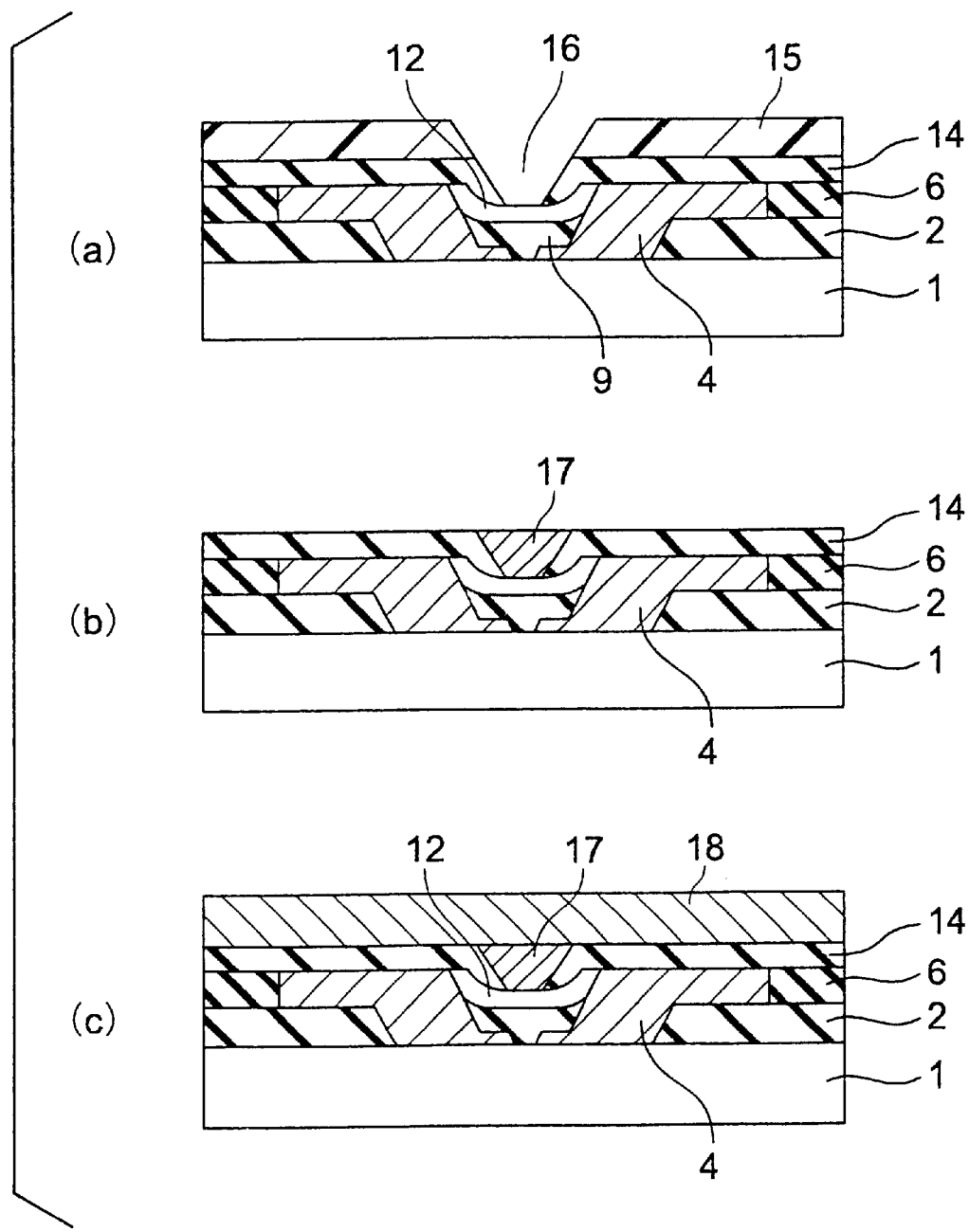
FIGS. 6(a) through 6(c) are sectional views showing steps of fabricating the fourth embodiment of the present invention.
Figure 7:
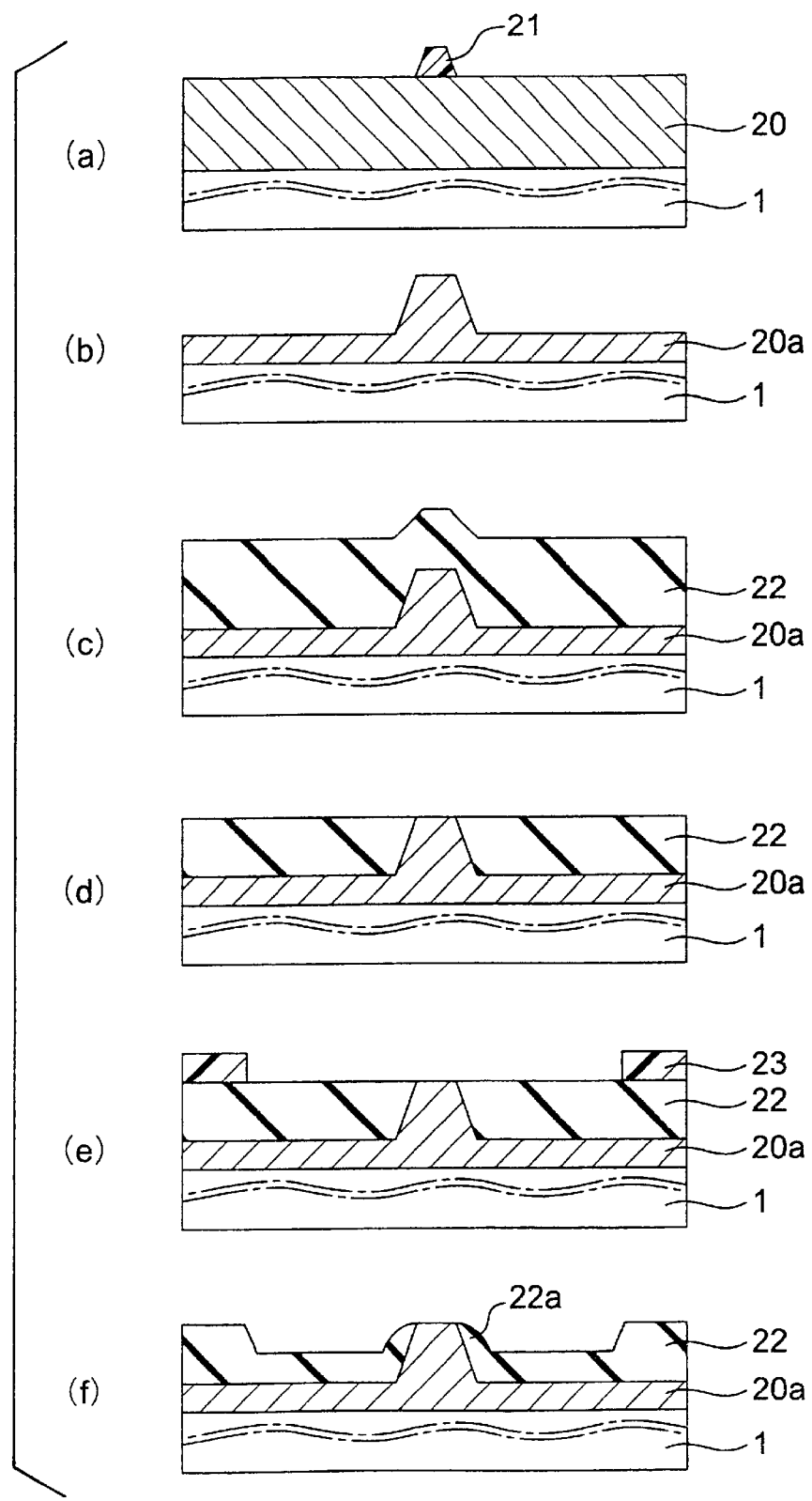
FIGS. 7(a) through 7(f) are sectional views showing steps of fabricating the fifth embodiment of the present invention.
Figure 8:
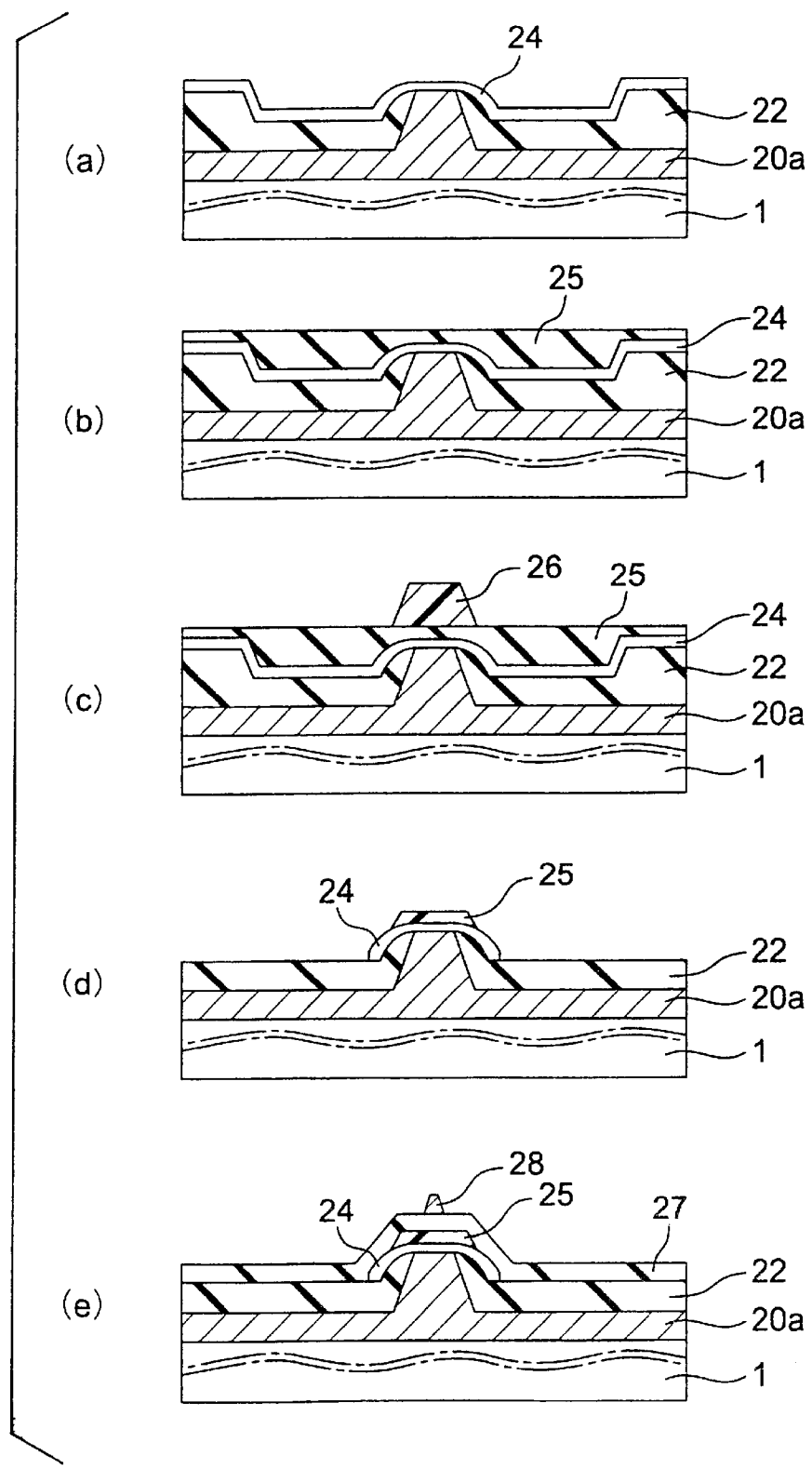
FIGS. 8(a) through 8(e) are sectional views showing steps of fabricating the fifth embodiment of the present invention.
Figure 9:
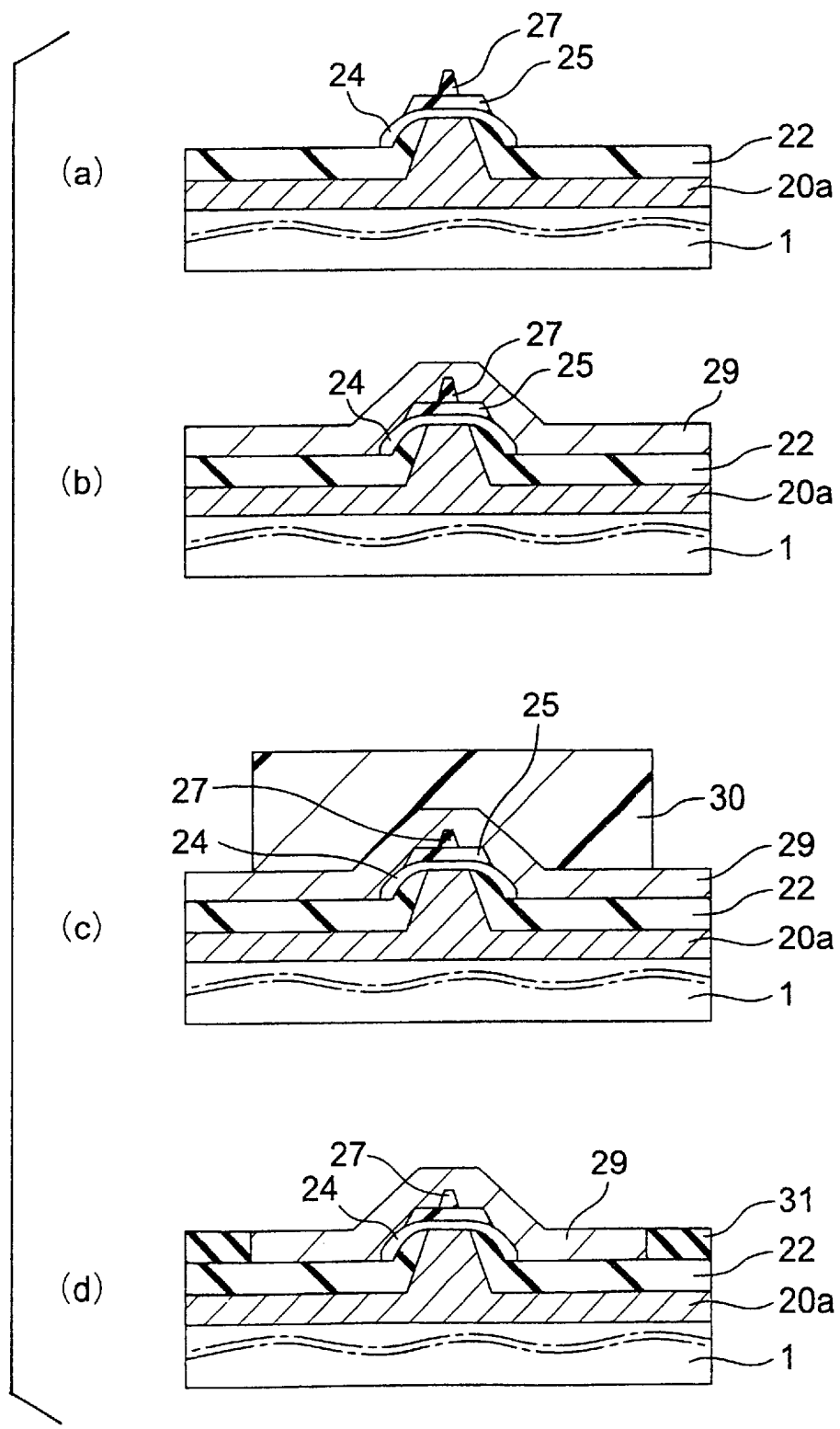
FIGS. 9(a) through 9(d) are sectional views showing steps of fabricating the fifth embodiment of the present invention.
Figure 10:
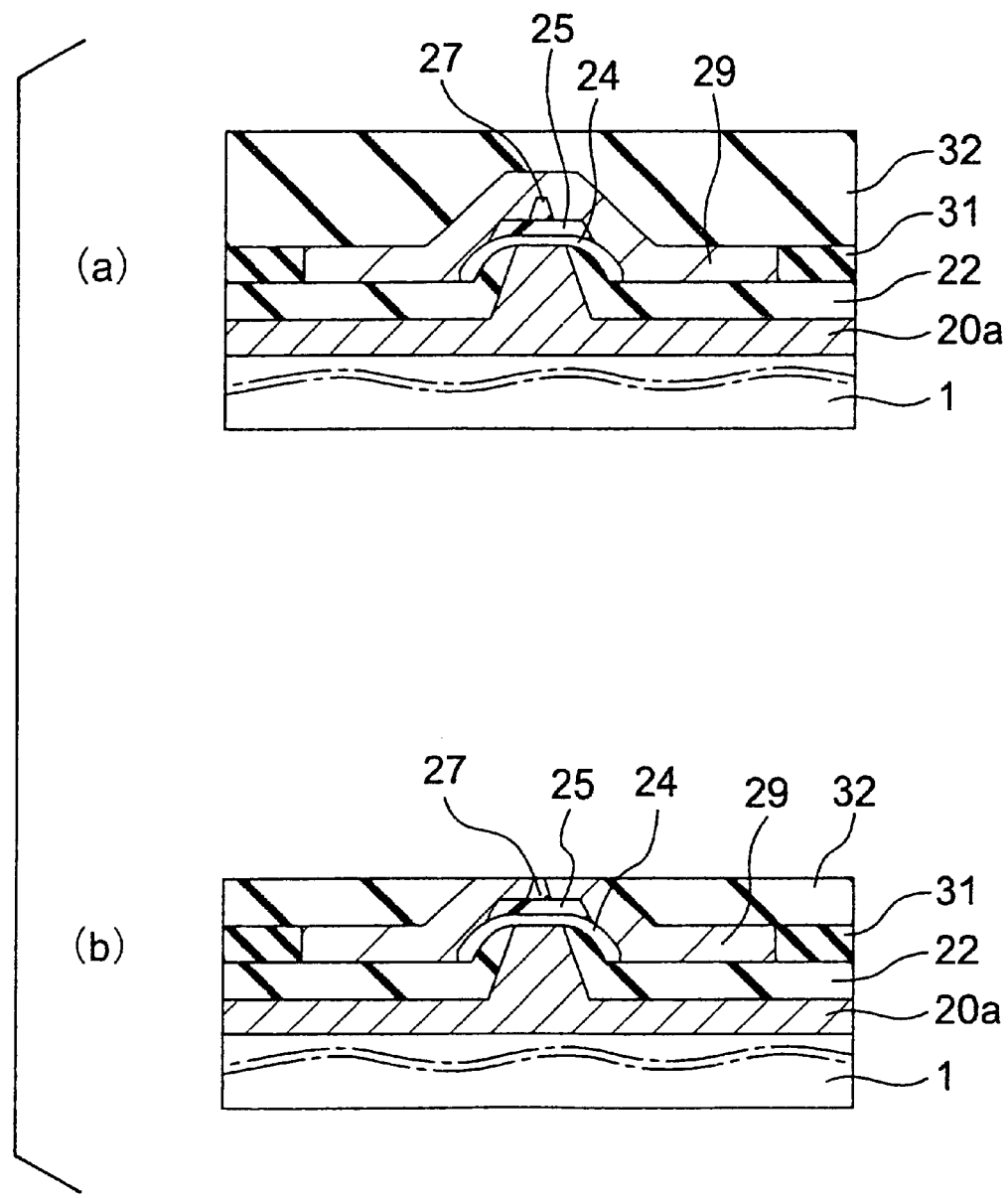
FIGS. 10(a) and 10(b) are sectional views showing steps of fabricating the fifth embodiment of the present invention.

Referring to FIGS. 4 through 6, the fourth embodiment of the present invention will be described below. This embodiment relates to a method for fabricating a horizontal reproducing magnetic head in the first embodiment shown in FIG. 1A, and its fabricating steps are shown in FIGS. 4 through 6.

First, as shown in FIG. 4(a), an insulating film 2 of, e.g., $SiO_2$, is deposited on an Si substrate 1, and a resist pattern 3 of a photoresist having an opening portion for forming magnetic yokes is formed on the insulating film 2. Then, the resist pattern 3 is used as a mask for etching the insulating film 2 by, e.g., the RIE (Reactive Ion Etching) to form a trench 2a in the insulating film 2 (see FIG. 4(b)). Subsequently, after the resist pattern is removed, a magnetic film 4 of, e.g., CoZrNb, to be formed as magnetic yokes is deposited so as to be filled in the trench 2a (see FIG. 4(c)).

Then, as shown in FIG. 4(d), after the magnetic film 4 is flattened by, e.g., the CMP (Chemical Mechanical Polishing), the magnetic film 4 is patterned by the photolithography technique. Then, an insulating film 6 of, e.g., SiO2, is filled around the patterned magnetic film 4 (see FIG. 4(d)). Subsequently, as shown in FIG. 4(e), a trench 7 is formed in the magnetic film 4 by the ion milling. Moreover, a portion 8 to be a tip portion of a magnetic gap is formed in the magnetic film 4 by the FIB (Focused Ion Beam) (see FIG. 4(f)).

Then, as shown in FIG. 5(a), after the magnetic gap portion is filled with an insulating film 9 of, e.g., $SiO_2$, it is flattened by the CMP. Subsequently, a resist pattern 10 having an opening portion 11 which is wider than the magnetic gap portion is formed (see FIG. 5(b)). Thereafter, the resist pattern 10 is used as a mask for etching the insulating film 9 of the magnetic gap portion by the RIE (see FIG. 5(c)). In this etching, $CHF_3$ was used as an etching gas, the flow rate thereof was 50 SCCM (Standard Cubic Centimeter per Minute), and the pressure thereof was 1 Pa. In this case, the etching selective ratio of the insulating film 9 of $SiO_2$ to the magnetic film 4 is 200:1 or more. Therefore, as shown in the figure, the insulating film 9 is preferentially etched by the different in etching rate, and the portion of the magnetic film 4 is hardly etched. For that reason, a portion having a difference in level is formed so as to be curved in the magnetic gap portion between the magnetic film 4 and the insulating film 9 (see FIG. 5(c)).

Then, after the resist pattern is removed, a magnetoresistance effect element film (which will be also hereinafter referred to as an MR film) 12 is deposited so as to be filled in the portion having the difference in level, as shown in FIG. 5(d). Thereafter, the MR film 12 formed in a region other than the magnetic gap is removed by the CMP using a hard pad (see FIG. 5(e)). Then, after an insulating film 14 of, e.g., $Al_2O_3$, is deposited on the whole surface, the insulating film 14 is flattened by the CMP (see FIG. 5(f)).

Then, as shown in FIG. 6(a), a resist pattern 15 of a photoresist having an opening portion is formed in the magnetic gap region, and this resist pattern is used as a mask for etching the insulating film 14 by the RIE to expose the surface of the MR film 12 to form a trench 16 in the insulating film 14. Then, after the resist pattern is removed, the trench 16 formed in the insulating film 14 is filled with a leading electrode 17 of, e.g., Cu (see FIG. 6(b)). Subsequently, an electrode 18 of Cu to be connected to the leading electrode 17 is formed (see FIG. 6(c)). Furthermore, the step shown in FIG. 6(b) and the step shown in FIG. 6(c) may be simultaneously carried out.

By the above described steps, it is possible to fabricate the horizontal reproducing magnetic head in the first embodiment shown in FIG. 1A. Furthermore, by forming the head as this embodiment, the magnetoresistance effect film 12 and the leading electrode 17 can be automatically aligned with the magnetic gap portion, so that the head can be formed without causing problems even in the case of the size required for an alignment precision which is impossible in the usual lithography technique.

As the magnetic film to be formed as magnetic yokes or a magnetic core, a crystalline magnetic film of NiFe, FeTaN, FeCo or the like, an amorphous magnetic film of CoZrNb or the like, or a granular magnetic film of $CoFe-Al_2O_3$ or the like may be used.

When the portion having the difference in level is formed in the magnetic gap, it may be formed so as to be curved in the magnetic gap by forming another non-magnetic material substituted for the insulating film so as to be thinner than the magnetic yokes.

(Fifth Embodiment)

Referring to FIGS. 7 through 10, the fifth embodiment of the present invention will be described below. This embodiment relates to a method for fabricating a horizontal reproducing magnetic head in the second embodiment shown in FIG. 2A, and its fabricating steps are shown in FIGS. 7 through 10.

First, as shown in FIG. 7(a), after a portion (not shown) of a bonding pad or the like is formed on an Si substrate 1, an electrode film 20 of, e.g., Cu, is deposited, and a resist pattern 21 of a photoresist is formed on the electrode film 20. Then, as shown in FIG. 7(b), the resist pattern 21 is used as a mask for etching the electrode film 20 by the RIE or the like to form an electrode 20a having a protruding portion. Subsequently, after the resist pattern is removed, a magnetic film 22 of, e.g., $Al_2O_3$, is deposited on the electrode 20a as shown in FIG. 7(c). Thereafter, the insulating film 22 is flattened by the CMP so that the head portion of the protruding portion of the electrode 20a is exposed (see FIG. 7(d)).

Then, as shown in FIG. 7(e), a resist pattern 23 of a photoresist is formed so that a wider portion than the exposed portion of the electrode 20a is open, and the insulating film 22 is etched by the RIE. At this time, $CHF_3$ was used as an etching gas, the flow rate thereof was 50 SCCM, and the pressure thereof was 1 Pa. In this case, the etching selective ratio of $Al_2O_3$ to Cu is 100:1 or more. Therefore, if $Al_2O_3$ is selectively etched, the insulating film 22 of $Al_2O_3$ remains on the side walls of the protruding portion of the electrode 20a to form a curved protruding portion 22a of the insulating film 22 (see FIG. 7(f)).

Then, after the resist pattern is removed, an MR film 24 is deposited on the whole surface as shown in FIG. 8(a). Then, after an insulating film 25 of, e.g., $Al_2O_3$, is deposited on the MR film 24, the insulating film 25 is flattened by the etch back or the like (see FIG. 8(b)). Subsequently, as shown in FIG. 8(c), a resist pattern 26 of a photoresist for covering the protruding portion of the electrode 20a is formed on the insulating film 25. Then, the resist pattern 26 is used as a mask for etching the insulating film 25 and the MR film 24 by a dry etching, such as the ion milling, to leave the MR film 24 and the insulating film 25 only in the region above the protruding portion of the electrode 20a (see FIG. 8(d)).

Thereafter, after the resist pattern is removed, an insulating film 27 of, e.g., $Al_2O_3$, is deposited on the whole surface, and a resist pattern 28 is formed in a region of the insulating film 27 above the protruding portion of the electrode 20a by the electron beam lithography or the like, as shown in FIG. 8(e).

Then, the resist pattern 28 is used as a mask for etching the insulating film 27 to form a portion to be the tip portion of a magnetic gap (see FIG. 9(a)). Then, after the resist pattern is removed, a magnetic film 29 of, e.g., CoZrNb, to be magnetic yokes is deposited on the whole surface as shown in FIG. 9(b). Subsequently, as shown in FIG. 9(c), a resist pattern 30 of a photoresist is formed so as to cover the protruding portion of the electrode 20a. After this resist pattern 30 is used as a mask for patterning the magnetic film 20, an insulating film 31 of, e.g., $SiO_2$, is filled around the patterned magnetic film 29 (see FIG. 9(d)).

Then, after the resist pattern is removed, an insulating film 32 of, e.g., $SiO_2$, is deposited on the whole surface as shown in FIG. 10(a). Furthermore, the step of filling with the insulating film 31 shown in FIG. 9(d) and the step of depositing the insulating film 32 shown in FIG. 10(a) may be simultaneously carried out. Subsequently, the insulating film 32 is flattened by the etch back, the CMP or the like to expose the tip portion of the magnetic gap (see FIG. 10(b)). If necessary, a DLC (Diamond Like Carbon) protective film is formed thereon.

By the above described steps, it is possible to fabricate the horizontal reproducing magnetic head in the second embodiment shown in FIG. 2.

As the magnetic film to be formed as magnetic yokes or a magnetic core, a crystalline magnetic film of NiFe, FeTaN, FeCo or the like, an amorphous magnetic film of CoZrNb or the like, or a granular magnetic film of $CoFe-Al_2O_3$ or the like may be used.

When the portion having the difference in level is formed in the magnetic gap, it may be formed so as to be curved in the magnetic gap by forming another non-magnetic material substituted for the insulating film so as to be thinner than the magnetic yokes.

(Sixth Embodiment)

Figure 12:
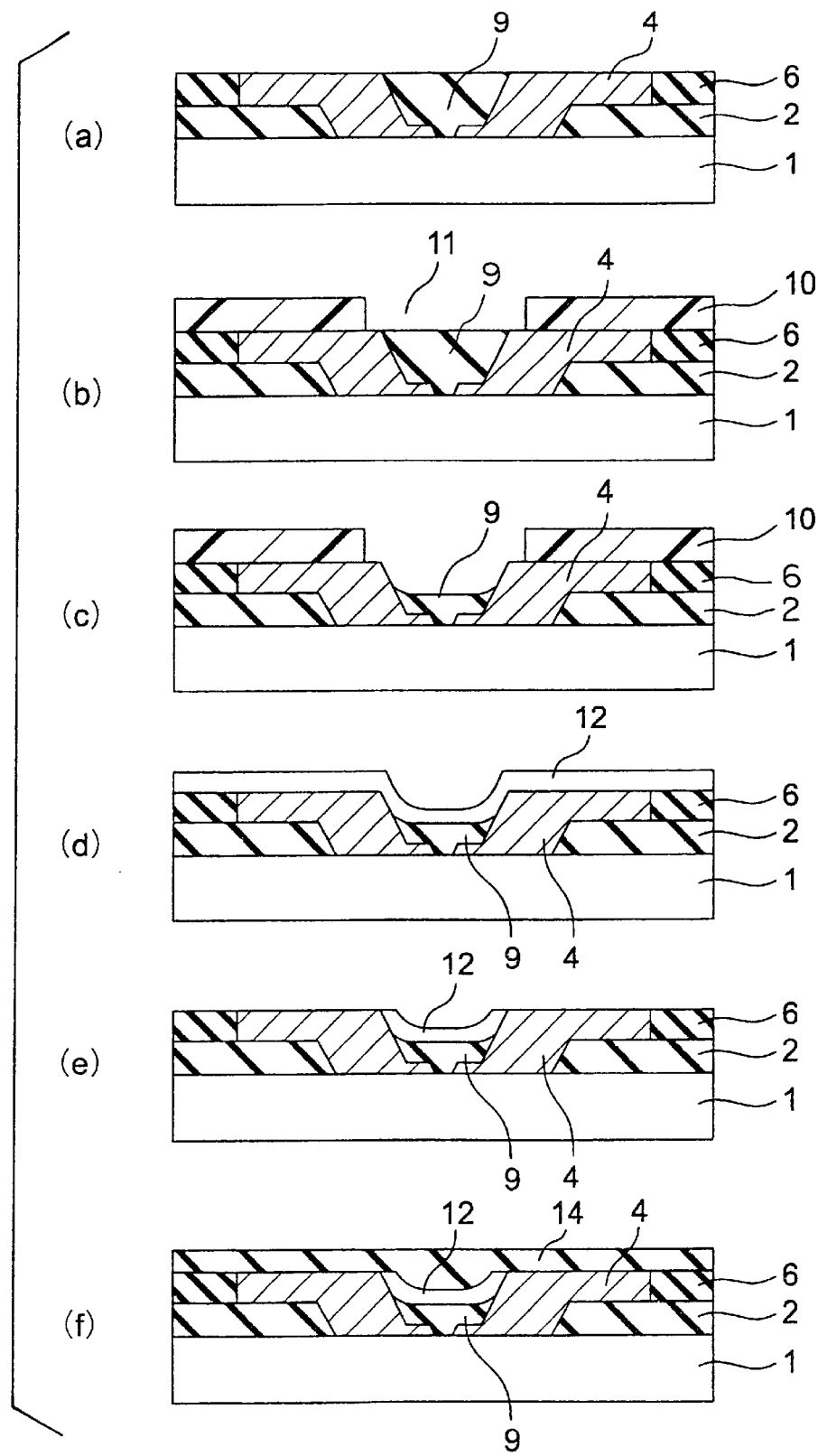
FIGS. 12(a) through 12(f) are sectional views showing steps of fabricating the sixth embodiment of the present invention.

Referring to FIGS. 11 through 13, the sixth embodiment of the present invention will be described below. This embodiment relates to a method for fabricating a horizontal reproducing magnetic head in the third embodiment shown in FIG. 3, and its fabricating steps are shown in FIGS. 11 through 13.

First, as shown in FIG. 11(a), an insulating film 2 of $SiO_2$ is deposited on an Si substrate 1, and a resist pattern 3 of a photoresist having an opening portion for forming magnetic yokes is formed on the insulating film 2. Then, the resist pattern 3 is used as a mask for etching the insulating film 2 by the RIE to form a trench 2a in the insulating film 2 (see FIG. 11(b)). Subsequently, after the resist pattern is removed, a magnetic film 4 of, e.g., CoZrNb, to be formed as magnetic yokes is deposited so as to be filled in the trench 2a (see FIG. 11(c)).

Then, as shown in FIG. 11(d), after the magnetic film 4 is flattened by, e.g., the CMP, the magnetic film 4 is patterned. Then, an insulating film 6 of, e.g., SiO2, is filled around the patterned magnetic film 4 (see FIG. 11(d)). Subsequently, as shown in FIG. 11(e), a trench 7 is formed in the magnetic film 4 by the ion milling. Moreover, a portion 8 to be a tip portion of a magnetic gap is formed in the magnetic film 4 by the FIB (see FIG. 11(f)).

Then, as shown in FIG. 12(a), after the magnetic gap portion is filled with an insulating film 9 of, e.g., $SiO_2$, it is flattened by the CMP. Subsequently, a resist pattern 10 having an opening portion 11 which is wider than the magnetic gap portion is formed (see FIG. 12(b)). Thereafter, the resist pattern 10 is used as a mask for etching the insulating film 9 of the magnetic gap portion by the RIE (see FIG. 12(c)). At this time, $CHF_3$ was used as an etching gas, the flow rate thereof was 50 SCCM, and the pressure thereof was 1 Pa. In this case, the etching selective ratio of the insulating film 9 of $SiO_2$ to the magnetic film 4 is 200:1 or more. Therefore, as shown in the figure, the insulating film 9 is preferentially etched by the different in etching rate, and the portion of the magnetic film 4 is hardly etched. For that reason, a portion having a difference in level is formed so as to be curved in the magnetic gap portion between the magnetic film 4 and the insulating film 9 (see FIG. 12(c)).

Then, after the resist pattern is removed, an MR film 12 is deposited so as to be filled in the portion having the difference in level, as shown in FIG. 12(d). Thereafter, the MR film 12 formed in a region other than the magnetic gap is removed by the CMP using a hard pad (see FIG. 12(e)). Then, after an insulating film 14 of, e.g., $Al_2O_3$, is deposited on the whole surface, the insulating film 14 is flattened by the CMP (see FIG. 12(f)).

Then, a resist pattern (not shown) of a photoresist having an opening portion is formed in a region including the magnetic gap, and this resist pattern is used as a mask for etching the insulating film 14 by the RIE to expose the surface of the MR film 12 (see FIG. 13(a)). Then, after the resist pattern is removed, an electrode film 19 of, e.g., Cu, is deposited as shown in FIG. 13(b), and the electrode is flattened by the CMP. Subsequently, as shown in FIG. 13(c), a resist pattern 35 of a photoresist having an opening portion is formed on the magnetic gap. Then, as shown in FIG. 13(d), this resist pattern is used as a mask for removing the electrode film 19 on the central portion of the MR film 12 by a dry etching such as the RIE. Thus, an opening portion 36 is provided in the central portion of the MR film 12, so that the electrode film 19 is divided into right and left two electrodes 19a and 19b (see FIG. 13(d)). Then, after the resist pattern 35 is removed, an insulating film 37 of, e.g., $Al_2O_3$, is deposited as shown in FIG. 13(e), and the insulating film 37 is flattened by the CMP.

By the above described steps, it is possible to fabricate the horizontal reproducing magnetic head in the third embodiment shown in FIG. 3.

As the magnetic film to be formed as magnetic yokes or a magnetic core, a crystalline magnetic film of NiFe, FeTaN, FeCo or the like, an amorphous magnetic film of CoZrNb or the like, or a granular magnetic film of $CoFe-Al_2O_3$ or the like may be used.

When the portion having the difference in level is formed in the magnetic gap, it may be formed so as to be curved in the magnetic gap by forming another non-magnetic material substituted for the insulating film so as to be thinner than the magnetic yokes.

(Seventh Embodiment)

Figure 14:
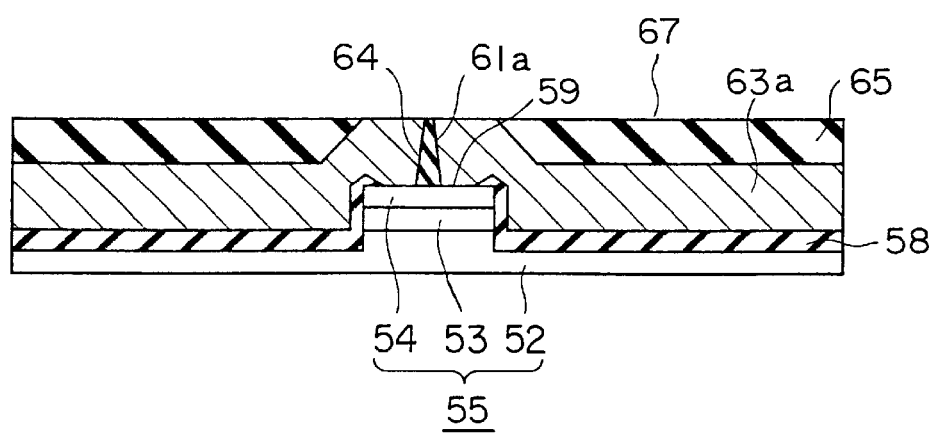
FIG. 14 is a sectional view showing the construction of the seventh embodiment of the present invention.

The construction of the seventh embodiment of the present invention is shown in FIG. 14. This embodiment relates to a horizontal thin-film magnetic head, and its sectional view in track longitudinal directions is shown in FIG. 14. The horizontal thin-film magnetic head in this embodiment comprises: a magnetoresistance effect film (which will be also hereinafter referred to as an MR film) 55, which has a free layer 52, a spacer layer 53 and a pinned layer 54, for detecting magnetic signals from a magnetic recording medium (not shown); and a magnetic yoke 63a having a magnetic gap 64 for guiding the magnetic signals from the magnetic recording medium to the MR film 55.

The free layer 52 has a protruding portion, the top face of which is substantially flat. The spacer layer 53 and the pinned layer 54 are sequentially stacked on the protruding portion. That is, the area of the film surface of the pinned layer 54 is designed to be smaller than the area of the film surface of the free layer 52. On the MR film 55, an insulating film 58 is formed in a region other than the top face of the pinned layer 54.

The magnetic yoke 63a is electrically connected to the top face of the pinned layer 54 in a portion including the magnetic gap 64 on the opposite surface to the medium facing surface, and its connection area is substantially defined by the area of the film surface of the pinned layer 54. That is, a portion of the MR film 55 except for the top face of the pinned layer 54 is electrically insulated from the magnetic yoke 63a by the insulating film 58. Therefore, it can be also said that the magnetic yoke 63a is connected to the pinned layer 54 via a contact hole 59 which is formed in the insulating film 58.

The magnetic gap 64 is filled with an insulating film 61a, and the top face of the magnetic yoke 63a except for the medium facing surface of the protruding portion of the magnetic yoke 63a is covered with an insulating film 65 of aluminum oxide or the like. Furthermore, a DLC (Diamond Like Carbon) film 67 is formed on the medium facing surface of the thin-film magnetic head in this embodiment.

The bottom face of the free layer 52, i.e., the opposite surface of the free layer 52 to the medium facing surface, is provided with one of electrodes (not shown) for applying a current to the MR film 55 in a direction perpendicular thereto, and the magnetic yoke 63a also serves as the other electrode. Furthermore, a sense current flowing through the MR film 55 flows from the electrode, which is formed on the bottom face of the free layer 52, to the free layer 52, the spacer 53, the pinned layer 54 and the magnetic yoke 63a in that order.

According to the thin-film magnetic head in this embodiment with such a construction, the surface having the minimum area, through which the current flowing through the MR film 55 in the direction perpendicular thereto passes, is the connection surface of the pinned layer 54 to the magnetic yoke 63a, i.e., the film surface of the pinned layer 54. For that reason, unlike conventional cases, no pillar electrode exists, so that the influence of a magnetic field due to current, which is generated from the electrode of the MR film 55, on the MR film 55 can be reduced as small as possible. Thus, the magnetic yoke can be arranged in the vicinity of the magnetoresistance effect film, so that it is possible to improve sensitivity.

Furthermore, the portion processed so as to be smaller than the area of the film surface of the free layer 52 may be only the pinned layer 54, or may be only a part of the upper portion of the pinned layer 54. In addition to the pinned layer 54, the spacer layer 53 may be smaller than the area of the film surface of the free layer 52. Alternatively, as shown in FIG. 14, in addition to the spacer layer 53, a part of the upper portion of the free layer 52 may be processed so as to be smaller. It is necessary for at least a part of the pinned layer 54 to be smaller than the film surface of the free layer 52. This is also the same when the MR film 55 comprises a multilayer film having four layers or more.

(Eighth Embodiment)

Figure 16:
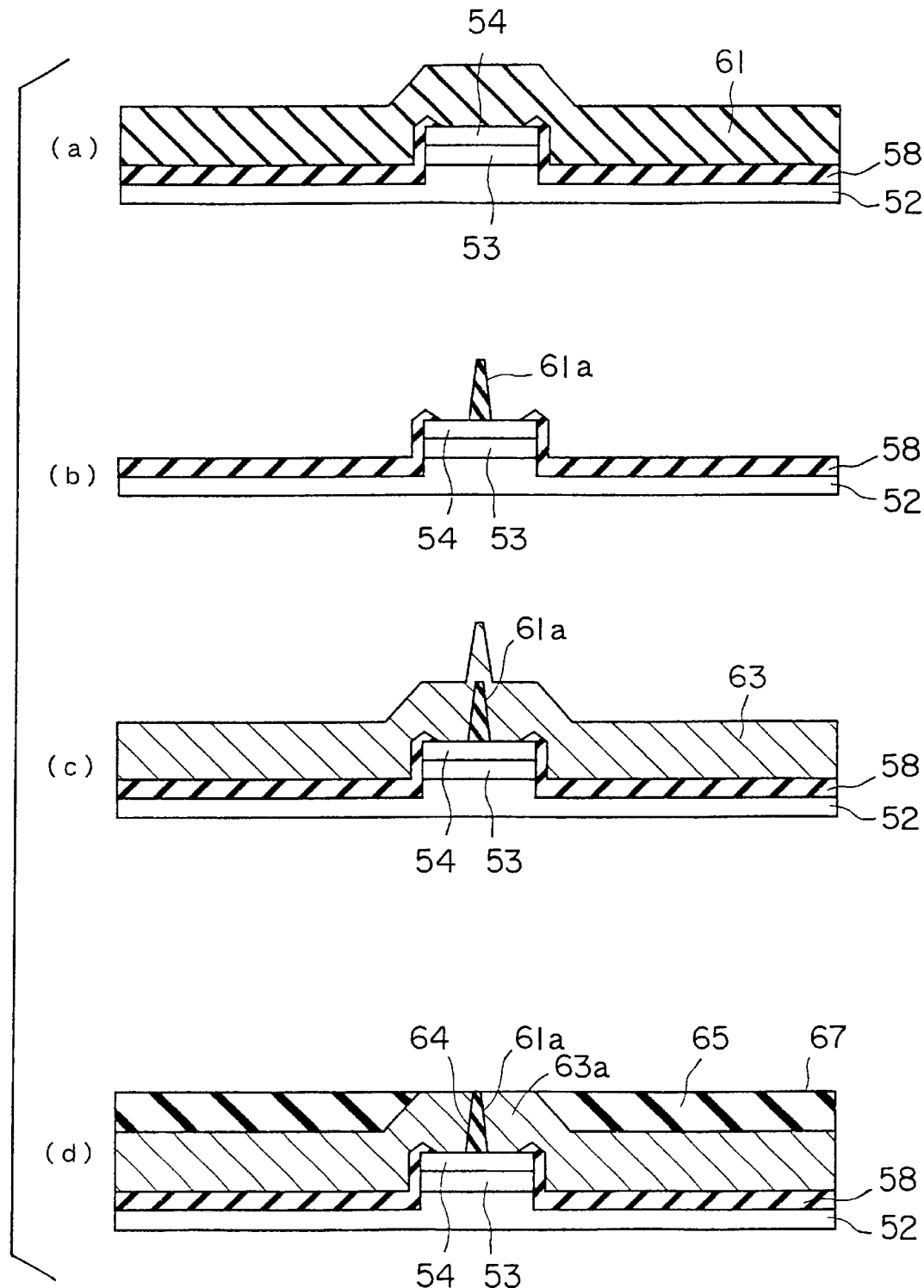
FIGS. 16(a) through 16(d) are sectional views showing steps of fabricating the eighth embodiment of the present invention.

Referring to FIGS. 15 and 16, the eighth embodiment of the present invention will be described below. This eighth embodiment relates to a method for fabricating a thin-film magnetic head in the seventh embodiment shown in FIG. 14, and its fabricating steps are shown in the sectional views of FIGS. 15 and 16.

First, an electrode film 80 is formed on a substrate (not shown). On this electrode film 80, a free layer 52, a spacer layer 53 and a pinned layer 54 are sequentially formed (see FIG. 15(a)). Then, a resist pattern 57 of a photoresist is formed on the pinned layer 53, and is used as a mask for etching the pinned layer 54, the spacer layer 53 and a part of the free layer 52 by, e.g., the RIE (Reactive Ion Etching) (see FIG. 15(b)). Furthermore, the film etched at this time may be only the pinned layer 54, or only the pinned layer 54 and the spacer layer 53 may be etched.

Then, as shown in FIG. 15(c), an insulating film 58 is formed on the whole surface while remaining the resist pattern 7. Thereafter, as shown in FIG. 15(d), the resist pattern is removed. Thus, a lift-off is carried out. In this embodiment, since the etching of the pinned layer 54 and the lift-off of the insulating film 58 are carried out by the same resist mask, the contact hole 59 formed in the insulating film 58 is self-aligned with the pinned layer 52. Furthermore, the self-aligning method should not be limited thereto.

Then, as shown in FIG. 16(a), an insulating film 61 of, e.g., AlOx, is deposited on the whole surface. Then, a mask (not shown) is formed on the insulating film 61 to be etched to form an insulating film 61a which is to be filled in a magnetic gap 64 which will be described later (see FIG. 16(b)). Thereafter, as shown in FIG. 16(c), a magnetic film 65 to be a magnetic yoke is deposited on the whole surface. Then, after a protective film 65 of, e.g., AlOx, is deposited on the magnetic film 63, the medium facing surface is flattened by, e.g., the CMP (Chemical Mechanical Polishing), to form a magnetic yoke 63a as shown in FIG. 16(d), and subsequently, the medium facing surface is covered with a DLC film 67. Thus, a thin-film magnetic head is prepared.

In this embodiment with such a construction, after the MR film 55 is formed by depositing the free layer 52, the spacer layer 53 and the pinned layer 54 on the side of the substrate surface in that order, the film surface of the pinned layer 54 can be processed so as to be smaller. Therefore, it is not required to carry out the steps of patterning and flattening of the pinned layer 54 during the stacking of the MR film 55, so that the reliability of the characteristics of the MR film 55 is improved. In addition, since the area of the pinned layer 54 can be substantially equal to the connection area to the magnetic yoke 63a, the current flowing from the pinned layer 54 into the magnetic yoke 63a diffuses in the whole magnetic yoke 63a, so that it is possible to omit a portion corresponding to a pillar electrode. In addition, the free layer 52 can be extended to an area suited to suck the magnetic flux from the magnetic yoke 63a. Moreover, it is possible to improve productivity. In particular, if a step of forming the contact hole 59, which is self-aligned with the pinned layer 54, in the insulating film 58 arranged between the MR film 55 and the magnetic yoke 63a is used, the contact hole corresponding to the area of the pinned layer can be formed without the alignment shift, although this is difficult when the contact hole 59 is prepared by etching using a resist mask which is prepared by exposure and development using a usual stepper. Therefore, yields are improved.

Furthermore, of course, the thin-film magnetic head fabricated by this embodiment can decrease the influence of a magnetic field due to current, which is generated from the MR film, on the MR film, so that sensitivity is improved.

(Ninth Embodiment)

Referring to FIG. 17, the ninth embodiment of the present invention will be described below. This ninth embodiment relates to a horizontal magnetic head, and its sectional view in track longitudinal directions is shown in FIG. 17. The thin-film magnetic head in this embodiment comprises: an MR film 55, which has a free layer 52, a spacer layer 53 and a pinned layer 54, for detecting magnetic signals from a magnetic recording medium (not shown); and a magnetic yoke 63*a* having a magnetic gap 64 for guiding the magnetic signals from the magnetic recording medium to the MR film 55. The MR film 55 has a protruding shape which is processed so that the pinned layer 54, the spacer layer 53 and a part of the free layer 52 substantially have the same area of the pinned layer 54. This protruding shape other than the surface of the uppermost pinned layer 52 is covered with an insulating film 58. The film surfaces of the insulating film 58 and pinned layer 52 form a flat surface which substantially the same height. On the pinned layer 52 and the insulating film 58, a magnetic yoke 63*a* is staked. The magnetic gap 63*a* has a magnetic gap 64 at the substantially center on the surface of the pinned layer 52. The magnetic gap 64 can be formed by a method for forming a groove by a technique, such as the ion milling, RIE, RIBE or focused ion beam etching, to grow a non-magnetic material therein after forming the magnetic yoke 63*a*. The magnetic yoke 63*a* is processed for defining the length of the medium facing surface in track longitudinal directions. The surface of the magnetic yoke 63*a* retracted from the medium facing surface is covered with a protective film 65 of aluminum oxide or the like, and the magnetic yoke 63*a* exposed to the medium facing surface and the surface of the protective film 65 are covered with a DLC film 67.

Also with this structure, it is possible to remove the pillar portion from the electrode for applying a current to the MR film 55 in a direction perpendicular thereto, so that it is possible to eliminate the influence of a magnetic field due to current from the electrode on the MR film 55. Moreover, the magnetic yoke can be arranged in the vicinity of the MR film, so that it is possible to improve the regenerative sensitivity. In addition, since it is not required to carry out flattening and etching steps while the MR film 55 is deposited, it is possible to collectively prepare a stacked structure, so that the characteristics of the MR film 55 are stabilized.

(Tenth Embodiment)

Referring to FIG. 18, the tenth embodiment of the present invention will be described below. This tenth embodiment relates to a horizontal magnetic head, and its sectional view in track longitudinal directions is shown in FIG. 18. The thin-film magnetic head in this embodiment comprises: an MR film 55, which has a free layer 52, a spacer layer 53 and a pinned layer 54, for detecting magnetic signals from a magnetic recording medium (not shown); and a magnetic yoke 63*a* having a magnetic gap 64 for guiding the magnetic signals from the magnetic recording medium to the MR film 55. The MR film 55 has a protruding shape which is processed so that the pinned layer 54, the spacer layer 53 and a part of the free layer 52 substantially have the same area of the pinned layer 54. This protruding shape other than the surface of the uppermost pinned layer 52 is covered with an insulating film 58. Although the thickness of the insulating film 58 is substantially equal to the height of the protruding shape of the MR film 55 in the vicinity of the protruding of the MR film 55, it increases as leaving the protruding shape. On the pinned layer 52 and the insulating film 58, a magnetic yoke 63*a* is staked. The magnetic gap 63*a* has a magnetic gap 64 at the substantially center on the surface of the pinned layer 52. The magnetic gap 64 can be formed by a method for forming a groove by a technique, such as the ion milling, RIE, RIBE or focused ion beam etching, to grow a non-magnetic material therein after forming the magnetic yoke 63*a*. Alternatively, a protruding portion of a magnetic material, which is to be the magnetic cap 64, may be previously formed, and thereafter, a magnetic material, which is to be the magnetic yoke 63*a*, may be deposited so as to surround the magnetic gap 64. The deposition method may be sputtering, plating or another method. The magnetic yoke 63*a* is processed for defining the length of the medium facing surface in track longitudinal directions. The surface of the magnetic yoke 63*a* retracted from the medium facing surface is covered with a protective film 65 of aluminum oxide or the like, and the magnetic yoke 63*a* exposed to the medium facing surface and the surface of the protective film 65 are covered with a DLC film 67.

Also with this structure, it is possible to remove the pillar portion from the electrode for applying a current to the MR film 55 in a direction perpendicular thereto, so that it is possible to eliminate the influence of a magnetic field due to current from the electrode on the MR film 55. Moreover, the magnetic yoke can be arranged in the vicinity of the MR film, so that it is possible to improve the regenerative sensitivity. In addition, since it is not required to carry out flattening and etching steps while the MR film 55 is deposited, it is possible to collectively prepare a stacked structure, so that the characteristics of the MR film 55 are stabilized. In addition, since the thickness of the insulating film 58 is large, the insulation of a bottom electrode (not shown), which is arranged below the free layer 52 and which has a wide area, from the magnetic yoke 63*a* is improved.

(Eleventh Embodiment)

Figure 19:
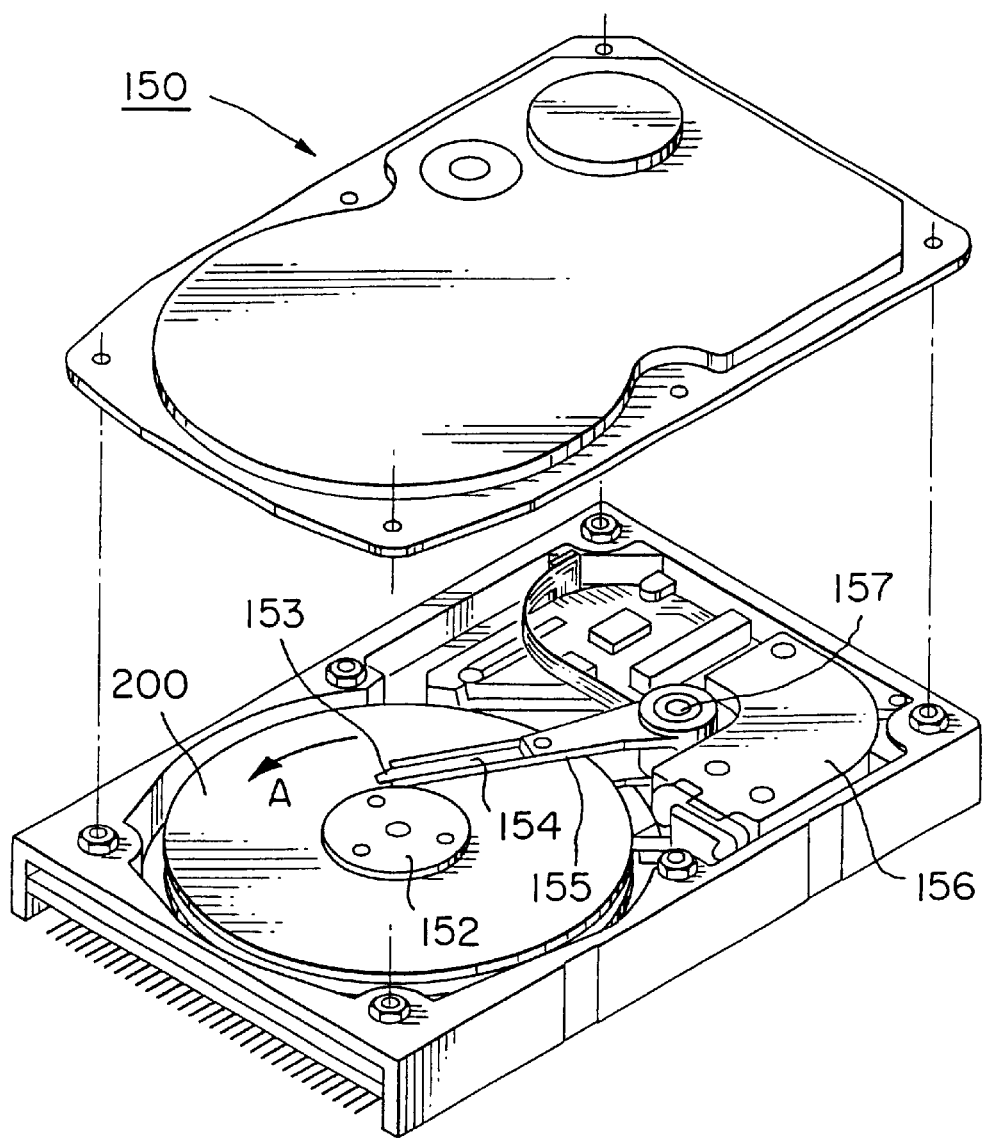
FIG. 19 is a perspective view schematically showing the construction of a principal part of the eleventh embodiment of the present invention.
Figure 20:
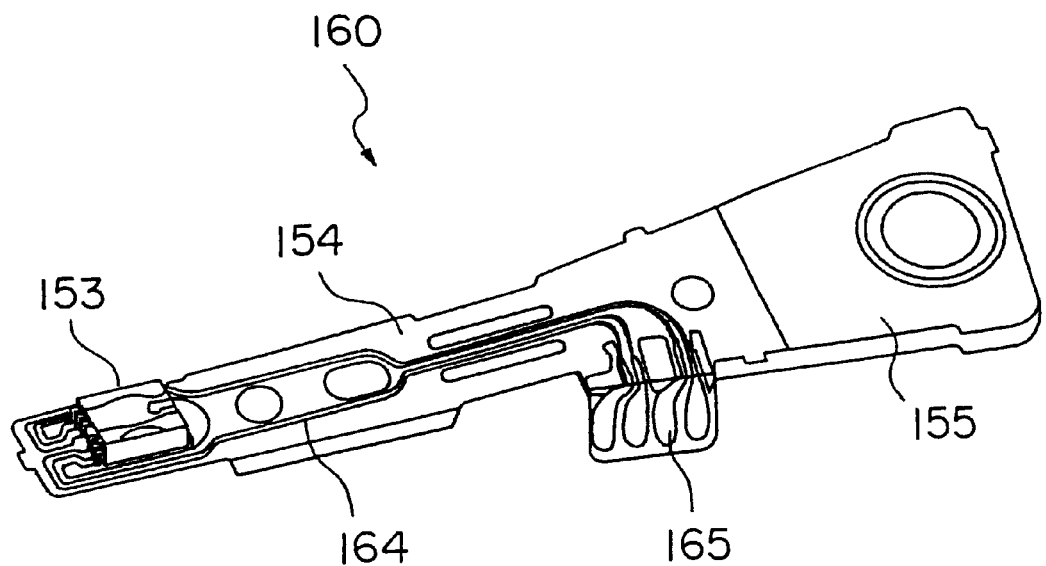
FIG. 20 is an enlarged perspective view of a magnetic head assembly in front of an actuator arm viewed from a disk.
Figure 21:
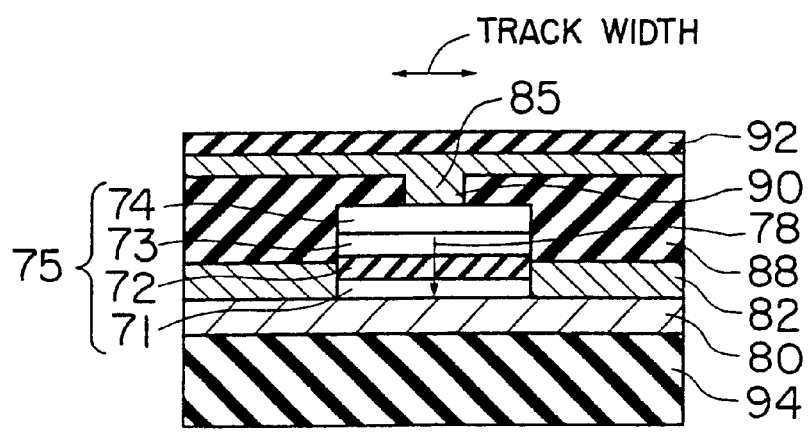
FIG. 21 is a sectional view showing the construction of a conventional horizontal thin-film magnetic head.

Referring to FIGS. 19 and 20, the eleventh embodiment of the present invention will be described below. This embodiment relates to a magnetic disk unit. The schematic construction of this magnetic disk unit is shown in FIG. 19. That is, the magnetic disk unit 150 in this embodiment is a unit of a type in which a rotary actuator is used. In FIG. 19, a magnetic disk 200 is mounted on a spindle 152, and is rotated in a direction of arrow A by means of a motor (not shown) which responds to a control signal from a drive unit control part (not shown). A head slider 153 for recording/reproducing information stored in the magnetic disk 200 is mounted on the tip of a thin-film-like suspension 154. For example, a magnetic head in any one of the above-described embodiments is provided in the vicinity of the head slider 153.

If the magnetic disk 200 rotates, the medium facing surface (ABS (Air Bearing Surface)) of the head slider 153 is held at a predetermined flying height from the surface of the magnetic disk 200.

The suspension 154 is connected to one end of an actuator arm 155 which has a bobbin portion or the like for holding a driving coil (not shown). On the other hand of the actuator arm 155, a voice coil motor 156 which is a kind of a linear motor is provided. The voice coil motor 156 comprises: a driving coil (not shown) wound onto the bobbin portion; and a magnetic circuit comprising permanent magnets, which are arranged so as to face each other via the coil, and facing yokes.

The actuator arm 155 is held by two ball bearings (not shown) which are provided above and below a fixing shaft 157, and is rotatable and slidable by means of the voice coil motor 156.

FIG. 20 is an enlarged perspective view of a magnetic head assembly in front of an actuator arm 155, which is viewed from the side of a disk. That is, the magnetic head assembly 160 has an actuator arm 151 having, e.g., a bobbin portion or the like for holding a driving coil, and a suspension 154 is connected to one end of the actuator arm 155.

A head slider 153 having a magnetic head described in any one of the above described embodiment is mounted on the tip of the suspension 154. Furthermore, a reproducing head and a recording head may be combined. The suspension 154 has a lead wire 164 for writing and reading signals. This lead wire 164 is electrically connected to each electrode of the magnetic head which is incorporated in the head slider. In FIG. 20, reference number 165 denotes an electrode pad of the magnetic head assembly 160.

Between the medium facing surface (ABS) of the head slider 153 and the surface of the magnetic disk 200, a predetermined flying height is set.

Furthermore, the magnetic disk unit may be a magnetic disk unit for carrying out only regeneration, or a magnetic disk unit for carrying out recording and regeneration. In addition, the medium should not be limited to a hard disk, but all of other magnetic recording medium, such as flexible disks and magnetic cards, may be used. Moreover, the magnetic disk unit may be a so-called "removable" type unit wherein a magnetic recording medium is removed from the unit.

As described above, according to the present invention, it is possible to arrange a magnetoresistance effect film in the vicinity of a medium facing surface and improve a regenerative sensitivity.

While the present invention has been disclosed in terms of the embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A yoke type reproducing magnetic head comprising:
   a pair of magnetic yokes facing each other via a magnetic gap, at least one of said pair of magnetic yokes extending from a medium facing surface to a position backed from said medium facing surface;
   a magnetoresistance effect film having a curved portion protruding toward said medium facing surface in said magnetic gap and being magnetically connected to said pair of magnetic yokes; and
   an electrode electrically connected to said magnetoresistance effect film,
   wherein a part of said electrode is electrically connected to a surface of said magnetoresistance effect film opposite to the protruding surface of said magnetoresistance effect film, a part of the protruding surface of said magnetoresistance effect film being electrically connected to said pair of magnetic yokes, and said pair of magnetic yokes being another electrode.

2. A yoke type reproducing magnetic head as set forth in claim 1, wherein said magnetoresistance effect film comprises:
   a magnetization free layer in which a direction of magnetization moves in response to a direction of a signal magnetic field;
   a non-magnetic layer stacked on said magnetization free layer; and
   a magnetization fixed layer which is stacked on said non-magnetic layer and in which the direction of magnetization does not substantially vary even in said signal magnetic field, said magnetization free layer being formed on the side of said medium facing surface.

3. A magnetic disk unit using a yoke type reproducing magnetic head according to claim 1, as a reproducing magnetic head.

4. A yoke type reproducing magnetic head comprising:
   a magnetic yoke having a magnetic gap; and
   a magnetoresistance effect film which comprises a magnetization free layer in which a direction of magnetization moves in response to a direction of a signal magnetic field, a non-magnetic layer stacked on said magnetization free layer, and a magnetization fixed layer which is stacked on said non-magnetic layer and in which the direction of magnetization does not substantially vary even in said signal magnetic field, a size of the film surface of a part of said magnetization fixed layer being formed so as to be smaller than the size of the film surface of said magnetization free layer,
   a part of said magnetic yoke, including said magnetic gap on a surface of said magnetic yoke opposite to a medium facing surface, being electrically connected to a top face of said magnetization fixed layer of said magnetoresistance effect film.

5. A yoke type reproducing magnetic head as set forth in claim 4, wherein said magnetic yoke is electrically insulated from said magnetoresistance effect film by an insulating film, except for the top face of said magnetization fixed layer.

6. A yoke type reproducing magnetic head as set forth in claim 5, wherein a film surface of said insulating film on the side of said magnetic yoke and the top face of said magnetization fixed layer substantially form a same flat surface.

7. A yoke type reproducing magnetic head as set forth in claim 5, wherein a thickness of said insulating film is substantially equal to a height from a film surface of said magnetization free layer to a film surface of said magnetization fixed layer in the vicinity of said magnetoresistance effect film, and the thickness of the insulating film increases with distance from said magnetization fixed layer.

8. A magnetic disk unit using a yoke type reproducing magnetic head according to claim 4, as a reproducing magnetic head.

9. A yoke type reproducing magnetic head as set forth in claim 4, wherein said magnetization fixed layer is located on a side of said magnetic yoke, said magnetization free layer is located remoter than said magnetization fixed layer from said medium facing surface, and said non-magnetic layer is located between said magnetization fixed layer and said magnetization free layer.

* * * * *